United States Patent
Yun et al.

(10) Patent No.: US 9,590,426 B2
(45) Date of Patent: Mar. 7, 2017

(54) SYSTEM AND METHOD FOR MANAGING A POWER DISTRIBUTION SYSTEM

(75) Inventors: Sang-Yun Yun, Daejeon (KR); Cheol-Min Chu, Daejeon (KR); Seong-Chul Kwon, Daejeon (KR); Il-Keun Song, Daejeon (KR)

(73) Assignee: KOREA ELECTRIC POWER CORPORATION, Seoul (KR)

( * ) Notice: Subject to any disclaimer, the term of this patent is extended or adjusted under 35 U.S.C. 154(b) by 467 days.

(21) Appl. No.: 14/241,322

(22) PCT Filed: Aug. 30, 2011

(86) PCT No.: PCT/KR2011/006415
§ 371 (c)(1),
(2), (4) Date: Feb. 26, 2014

(87) PCT Pub. No.: WO2013/032044
PCT Pub. Date: Mar. 7, 2013

(65) Prior Publication Data
US 2014/0207300 A1    Jul. 24, 2014

(30) Foreign Application Priority Data
Aug. 26, 2011   (KR) .......................... 10-2011-0085643

(51) Int. Cl.
  *H02J 4/00*     (2006.01)
  *H02J 3/38*     (2006.01)
  (Continued)

(52) U.S. Cl.
  CPC ............. *H02J 4/00* (2013.01); *H02H 1/0092* (2013.01); *H02H 7/263* (2013.01); *H02J 3/381* (2013.01);
  (Continued)

(58) Field of Classification Search
  None
  See application file for complete search history.

(56) References Cited

U.S. PATENT DOCUMENTS

| 5,568,399 A * | 10/1996 | Sumic ................. G01R 31/086 700/293 |
| 8,370,285 B2 * | 2/2013 | Muthu-Manivannan G06N 5/025 706/47 |
| 2007/0286089 A1 * | 12/2007 | Nasle ................. G06F 17/5009 370/245 |

FOREIGN PATENT DOCUMENTS

| KR | 10-1999-0061236 A | 7/1999 |
| KR | 10-0622084 B1 | 9/2006 |

(Continued)

OTHER PUBLICATIONS

Byeong-Goo Kim et al., "Fuzzy Logic based Faulted Section Identification Method," Journal of 2011 Summer Conference of KIEE, 2011. With English Abstract.
(Continued)

*Primary Examiner* — Sean Shechtman
*Assistant Examiner* — Steven Garland
(74) *Attorney, Agent, or Firm* — McDermott Will & Emery LLP

(57) ABSTRACT

Disclosed herein is a system and method for managing a power distribution system in which has an improved system protection and fault section determination structure in consideration of distributed power supplies, has an improved server and communication structure for one-to-one synchronization measurement, and conducts real time system management and control. The system for managing the power distribution system uses field measurement data and an event signal to detect a protection coordination correction value of a protective device for protection of the system and a fault section of the power distribution system, performs
(Continued)

real time system analysis using the field measurement data, and transmits control information including at least one of the protection coordination correction value, the fault section and the system analysis information to a DCP server.

20 Claims, 17 Drawing Sheets

(51) Int. Cl.
    *H02H 1/00*     (2006.01)
    *H02H 7/26*     (2006.01)
    *H02J 3/00*     (2006.01)

(52) U.S. Cl.
    CPC ......... *H02J 2003/007* (2013.01); *Y02E 60/76* (2013.01); *Y04S 40/22* (2013.01)

(56) References Cited

FOREIGN PATENT DOCUMENTS

| | | | |
|---|---|---|---|
| KR | 10-2009-0032395 A | 4/2009 |
| KR | 10-2009-0119058 A | 11/2009 |
| KR | 10-2011-0034428 A | 4/2011 |

OTHER PUBLICATIONS

International Search Report issued in International Application No. PCT/KR2011/006415 issued on Sep. 26, 2012.

\* cited by examiner

SYSTEM AND METHOD FOR MANAGING A POWER DISTRIBUTION SYSTEM

TECHNICAL FIELD

An embodiment of the present invention relates, in general, to systems and methods for managing power distribution systems and, more particularly, a system and method for managing a power distribution system which detects a fault section of the power distribution system through a real time distribution system analysis and control process and conducts protection coordination of the power distribution system.

This application is the U.S. National Phase under 35 U.S.C. §371 of International Application No. PCT/KR2011/006415, filed on Aug. 30, 2011, which in turn claims the benefit of Korean Patent Application No. 10-2011-0085643, filed on Aug. 26, 2011, the disclosures of which Applications are hereby incorporated by reference in its entirety into this application.

BACKGROUND ART

Generally, systems for managing power distribution systems manage a power distribution system, under constraint conditions in which a power distribution system has no separate power supply except active and reactive power (MW/MVAr power injection) supplied from a transmission network, and the power distribution system must maintain a radial structure. As shown in FIG. 1, a conventional system for managing a power distribution system includes a DMS server 10, a feeder FEP 20, a DG FEP 30, a station FEP 40, an AMR 45, an FM 46, a CIS 47, a distribution system managing database 52, a real time database 54, a control database 56, a history database 58, an operator terminal 60, a GIS server 70, a history server 80 and a simulator 90 which are connected to each other through a network. The DMS server 10 is connected to the feeder FEP 20 which is connected to a plurality of distribution automation terminal devices (22; feeder remote terminal units; hereinafter, referred to as FRTUs), the DG FEP 30 which is connected to a plurality of DG RTUs 32, and the station FEP 40 which is connected to a plurality of station RTUs 44. The DMS server 10 stores data obtained from the Feeder FEP 20, the DG FEP 30 and the station FEP 40. The DMS server 10 uses the obtained data to detect occurrence of a fault of the power distribution system and uses a fault indication signal (hereinafter, referred to as an FI signal) to restore the fault. The DMS server 10 manages a distribution system managing database 52 which stores distribution system managing data including contraction data, customer data, equipment data, a base map, etc., a real time database 54, a control database 56, a history database 58, etc.

The FRTUs 22 are connected to the feeder FEP 20. The feeder FEP 20 obtains conditions (analog and digital) from the different kinds of FRTUs 22 and transmits them to the DMS server 10.

The operator terminal 60 transmits an alarm to an operator through an HMI (human machine interface). The operator detects a location where the fault occurs based on the alarm. If a fault occurs between an automatic switch B and an automatic switch D which are disposed between the FRTU A and the FRTU B of the power distribution system, FI signals are transmitted from the FRTU A and the FRTU B, and protective devices such as a circuit breaker, recloser, etc. remove the fault of the power distribution system. The operator remotely opens the automatic switch B and the automatic switch D and separates the fault point from the system. After the fault section has been separated, the operator changes over a normal section in a power failure section to a peripheral line so that power supply can be continued.

In the conventional system for managing the power distribution system, with regard to a fault of the power distribution system, an inflow value of a power transmission system is only one of fault current, and a current inflow path is a single flow path. Therefore, as shown in FIG. 2, in the case where the operation of the protective devices is normal, a protective device which is disposed at a higher level than the fault point is used to remove the fault. The operator opens switches provided at a point B and a point C to separate the fault section from the system. In addition, the operator changes over a load disposed below the point C to a peripheral line so that power can be continuously supplied thereto. A fault current removal method of the protective device includes protection coordination using operation time difference generated by overcurrent relaying. Furthermore, except in a special case, setting a current relay is conducted when the current relay is installed.

In the conventional system for managing the power distribution system, a system fault restoration process is as follows. When a fault occurs, an FI signal is transmitted in an event signal form from the FRTU 22 to the operator. The operator determines a fault section based on the FI signal.

As shown in FIG. 3, the conventional system for managing the power distribution system is configured such that current system conditions are determined by measuring voltage/current/phase at locations at which the automatic switches are installed. As shown in FIG. 4, because there are constraint conditions in which the power distribution system must always be operated in a radial form, voltage and power flow of sections between the installation points of the automatic switches can be inferred only by measuring voltage and power flow at the installation points of the automatic switches. This can be embodied only by the intuition of the operator. However, such measurement data is necessary to be synchronized, and it is very difficult to check detailed system conditions using only partial data.

The conventional system for managing the power distribution system is configured in such a way that system conditions are checked only by judgment (intuition) of the operator without conducting real time system analysis and control. Therefore, in the case where there is a change in the equipment database because of, for example, a change in equipment of the system, it is required to restart the system so as to change the real time database 54. As a result, the availability of the management system is reduced.

Recently, in management of the power distribution system, due to distributed power supply applied to the power distribution system, the above two kinds of constraint conditions may not be always satisfied.

Given this, as shown in FIG. 5, if a fault occurs between points B and C, fault open paths $I_{f2}$ and $I_{f3}$ derived from the distributed power supplies are added, as well as, fault current $I_{f1}$ supplied from the transmission network. Therefore, as in the conventional system, even if the protective device of the point B is operated by overcurrent relaying, because the fault current paths derived from the distributed power supplies remain, removal of the fault is not completed. Furthermore, unlike the transmission network, given the characteristics of the power distribution system in which changes in system topology (changes in conditions of junction switches) frequently occur, use of a fixed protection coordination correction values may cause a problem.

In the conventional system for managing the power distribution system, when a fault occurs, a plurality of FI signals are transmitted to the operator at the same time. In the FI signals, FI signals generated by an error are contained. This problem is further complicated by the distributed power supplies applied to the system. Therefore, it is difficult for the operator to intuitionally determine a fault section based on the FI signals and restore the fault section as in the conventional technique.

Furthermore, as shown in FIG. 6, in the conventional system for managing the power distribution system, conditions such as voltage, power flow, etc. of the system are frequently changed by changes in a generation rate and a load because of the distributed power supplies applied to the power distribution system. Therefore, if only voltage and power flow values of automatic switches of some points are used, it is difficult for the operator to intuitionally estimate voltage and power flow conditions of the remnant sections.

In addition, in the conventional system for managing the power distribution system, to prevent the intuition of the operator to determine the conditions of the system from being reduced because of the distributed power supplies applied to the system, real time system analysis is required. For this, a data supply structure for real time management is necessary. However, the conventional technique is problematic in that the system must restart to change the database 54.

DISCLOSURE

Technical Problem

Accordingly, an embodiment of the present invention has been made keeping in mind the above problems occurring in the prior art, and an object of an embodiment of the present invention is to provide a system and method for managing a power distribution system which has an improved system protection and fault section determination structure in consideration of distributed power supplies, has an improved server and communication structure for one-to-one synchronization measurement, and conducts real time system management and control.

Another object of an embodiment of the present invention to provide a system and method for managing a power distribution system which uses a fault indication signal contained in an event signal generated from the power distribution system so as to detect a fault section.

A further object of an embodiment of the present invention to provide a system and method for managing a power distribution system which is configured such that when there is a change in the system, protection conditions are checked, and adaptive protection coordination of the power distribution system is conducted.

Yet another object of an embodiment of the present invention to provide a system and method for managing a power distribution system which uses IEC 61850 communication so that a function which has been conducted only in a main server can also be performed in an application middleware structure, whereby data can be obtained at the same time.

Still another object of an embodiment of the present invention to provide a system and method for managing a power distribution system which has a structure capable of synchronizing data such that a change of the system such as addition of equipment or a measurement point is possible without restarting the system.

Technical Solution

In accordance with an aspect of an embodiment of the present invention to accomplish the above object, there is provided a system for managing a power distribution system, the power distribution system including a plurality of protective devices provided on lines between a substation, a transformer and a load, and a plurality of distribution automation terminal devices installed in the respective protective devices, the system including: an SOTS terminal collecting field measurement data measured by the distribution automation terminal devices at a same time, and an event signal generated from the distribution automation terminal devices; a DCP server receiving the field measurement data and the event signal from the SOTS terminal, receiving a control command for the distribution automation terminal devices, and transmitting the control command to the corresponding distribution automation terminal devices; a main server detecting protection coordination correction values of the protective devices for system protection and detecting a fault section of the powder distribution system based on the event signal received from the DCP server, the main server conducting a real time system analysis using the field measurement data, and transmitting control information including at least one among the detected protection coordination correction values, the fault section and the system analysis information to the DCP server; and a database storing and managing at least one among the field measurement data, the event signal, the protection coordination correction values, the fault section and the system analysis information that are received from the main server.

The main server may include: a communication unit receiving the field measurement data and the event signals from the DCP server, the communication unit transmitting control information including at least one among the protection coordination correction values, the fault section and the system analysis information to the DCP server; a control unit generating a fault section detection control command for detection of the fault section of the power distribution system when the event signal contains a fault indication signal, and generating a fault restoration control command when the fault section of the power distribution system is detected, the control unit generating a protection coordination control command when the event signal contains a topology change signal; a fault processing unit detecting the fault section of the power distribution system using a fuzzy inference method and a center-of-gravity method when the control unit generates the fault section detection control command; and an application management unit detecting the protection coordination correction values of the protective devices of all independent systems of the power distribution system when the control unit generates the protection coordination control command and then transmitting the protection coordination correction values to the DCP server, the application management unit creating, based on the detected fault section, a switch operation list of the distribution automation terminal device corresponding to the fault section when the fault processing unit generates the fault restoration control command for the detect fault section, and transmitting the control command including the switch operation list to the DCP server through the communication unit.

The system may further include a system processing unit conducting a real time system analysis, using the field measurement data that is measured and synchronized at the same time, when the control unit generates a real time system analysis control command.

The fault process unit may: fuzzify, using a conditional membership function, a physical size for an image current of a switch that is contained in the fault indication signal, thus creating fuzzy data; conduct fuzzy inference using a min-max composition based on the fuzzy data and the fuzzy rule, thus creating fuzzy inference data; calculate, using the fuzzy inference data, an area of the consequent membership function corresponding to a component value set in each of the sections of the power distribution system; calculate, using the center-of-gravity method, a center of gravity of the calculated area of each section; and determine, as the fault section, the section that has a largest center of gravity among the calculated centers of gravity of the sections.

The application management unit may include: a protection coordination processing module: conducting fault calculation for all the independent systems of the power distribution system when the event signal contains the topology change signal; changing load data using at least one among a current value, a maximum value and load pattern data at a specific point of time based on a preset reference value; conducting, using changed load data, power flow calculation of the independent systems to which respective switches belong and calculates a protection capacity of a corresponding system; storing the protection capacity in the database when the protection capacity of each of the independent systems is the reference value or more; when the protection capacity of each of the independent systems is the reference value or less and is in a protection coordination section using communication, receiving initial IP addresses of the protective devices of the corresponding independent systems and conducts a topology test to identify a pair of protective devices to transmit and receive communication signals, thus creating a final IP address list; when the protection capacity of each of the independent systems is the reference value or less and is not in a protection coordination section using communication, receiving a current protection coordination correction value and characteristic data of the protective device of the corresponding independent system and conducts overcurrent protection coordination correction in response to a correction rule, thus calculating a protection coordination correction value; and transmitting the IP address list or the protection coordination correction value to the corresponding protective device through the DCP server and stores the IP address list or the protection coordination correction value in the database; and a fault restoration processing module creating, based on the detected fault section, a switch operation list of the distribution automation terminal device corresponding to the fault section, and transmitting a control command including the switch operation list to the DCP server through the communication unit.

The system processing unit may: create electrical busbars and independent systems based on current system topology; infer a section load of each of sections of the independent systems based on field measurement data; calculates a voltage, a phase and a power inflow rate of each of the busbars; create a base case based on the section load, the voltage, the phase and the power inflow rate; and conduct voltage and reactive power control based on the base case.

The database may include: a measurement data DB storing the field measurement data received from the DCP server; and an application DB storing topology, load inference, condition inference, power flow calculation, voltage and reactive power that are created using the field measurement data.

The application DB may include a data mapping table for data synchronization with the measurement data DB, stores the field measurement data from the measure data DB based on the data mapping table, stores the topology, the load inference, the condition inference, the power flow calculation, the voltage and the reactive power in the measurement data DB based on the data mapping table, and synchronizes data with the measurement data DB.

The SOTS terminal may include: a plurality of SOTS slave terminals collecting field measurement data from the distribution automation terminal devices; and a SOTS master terminal collecting the field measurement data from the SOTS slave terminals and transmitting the field measurement data to the DCP server, wherein the SOTS slave terminals and the SOTS master terminal comprise communication terminals conducting IEC 61850 communication.

The system may further include an SOTS backup terminal configured to be synchronized with the SOTS terminal, the SOTS backup terminal collecting, through changeover when the SOTS terminal malfunctions, both the field measurement data that is measured at the same time by the distribution automation terminal devices provided in the respective protective devices and the event signal generated from the distribution automation terminal devices and transmitting the field measurement data and the event signal to the DCP server.

The system may further include a DCP backup server configured to be synchronized with the DCP server, the DCP backup server receiving the field measurement data and the event signal from the SOTS terminal through changeover when the DCP server malfunctions, receiving a control command for the distribution automation terminal devices transmitted from the main server, and transmitting the control command to the corresponding distribution automation terminal device.

The system may further include a backup server configured to be synchronized with the main server, the backup server calculating protection coordination correction values of the protective devices for system protection based on the event signal received from the DCP server when the main server malfunctions, detecting the fault section of the power distribution system based on the event signal, conducting real time system analysis using the field measurement data, transmitting control information including at least one among the detected protection coordination correction values, the fault section and the system analysis information to the DCP server, updating power distribution system information when equipment of the power distribution system is added or changed, and synchronizing the power distribution system information with the main server.

The system may further include a backup database configured to be synchronized with the database, the backup database storing and managing the field measurement data and the event signal when the database malfunctions.

In accordance with another aspect of an embodiment of the present invention to accomplish the above object, there is provided a method for managing a power distribution system, the power distribution system including a plurality of protective devices provided on lines between a substation, a transformer and a load, and a plurality of distribution automation terminal devices installed in the respective protective devices, the method including: receiving field measurement data that is measured by the distribution automation terminal devices at a same time; receiving an event signal generated from the distribution automation terminal devices; detecting a fault section of the power distribution system based on the received event signal; calculating protection coordination correction values of the protective devices for all independent systems of the power distribution system based on the received event signal; conducting real time system analysis using the field measurement data received from the DCP server; and transmitting control information including at least one among the protection coordination correction value, the fault section and system analysis information to the corresponding distribution automation terminal device.

The method may further include storing at least one among the field measurement data, the event signal, the protection coordination correction values, the fault section and the system analysis information.

Detecting the fault section may include: generating a control command for detecting the fault section of the power distribution system when the event signal includes a fault indication signal; fuzzifying a physical size for an image current of a switch that is contained in the fault indication signal using a conditional membership function when the control command for detecting the fault section is generated, thus creating fuzzy data; conducting fuzzy inference using min-max composition based on the fuzzy data and a fuzzy rule, thus creating fuzzy inference data; calculating an area of a consequent membership function that corresponds to a component value set for each of sections of the power distribution system using the fuzzy inference data; calculating a center of gravity of the area of each of the sections using a center-of-gravity method; detecting, as the fault section, a section that has a largest center of gravity among the calculated centers of gravity of the sections; and generating a fault restoration control command for the detected fault section.

Generating the fault restoration control command may include: creating, based on the detected fault section, a switch operation list of the distribution automation terminal device corresponding to the fault section; and transmitting a control command including the switch operation list to the corresponding distribution automation terminal device.

Calculating the protection coordination correction values of the protective devices may include: generating a protection coordination control command when the received event signal includes a topology change signal; conducting fault calculation for all the independent systems of the power distribution system when the protection coordination control command is generated; changing load data using at least one among a current value, a maximum value and load pattern data at a specific point of time based on a preset reference value; calculating a protection capacity of a corresponding system by conducting power flow calculation of the independent system, to which respective switches belong, using the changed load data; storing the protection capacity when the protection capacity of each of the independent systems is a reference value or more; receiving initial IP addresses of the protective devices of the corresponding independent systems, when the protection capacity of each of the independent systems is the reference value or less and is in a protection coordination section using communication, and conducting a topology test to identify a pair of protective devices to transmit and receive communication signals, thus creating a final IP address list; receiving a current protection coordination correction value and characteristic data of the protective device of the corresponding independent system, when the protection capacity of each of the independent systems is the reference value or less and is not in a protection coordination section using communication, and conducting overcurrent protection coordination correction in response to a correction rule, thus calculating a protection coordination correction value; and transmitting the IP address list or the protection coordination correction value to the corresponding protective device.

Conducting the real time system analysis may include conducting real time system analysis, using the field measurement data measured at the same time, when the real time system analysis control command is generated.

Conducting the real time system analysis may include: creating electrical busbars and independent systems based on current system topology; calculating a section load of each of sections of the independent systems based on the field measurement data; calculating a voltage, a phase and a power inflow rate of each of the busbars; creating a base case based on the section load, the voltage, the phase and the power inflow rate; and conducting voltage and reactive power control based on the base case.

The method may further include synchronizing the field measurement data, the event signal, the protection coordination correction value, the fault section and the system analysis information that are stored in a measurement data DB and an application DB, based on a data mapping table.

The method may further include: synchronizing an SOTS terminal with an SOTS backup terminal; and collecting, through changeover when the SOTS terminal malfunctions, both the field measurement data that is measured at the same time by the distribution automation terminal devices provided in the respective protective devices and the event signal generated from the distribution automation terminal devices, and transmitting the field measurement data and the event signal to the DCP server.

The method may further include: synchronizing the DCP server with a DCP backup terminal; and receiving the field measurement data and the event signal through changeover when the DCP server malfunctions, receiving a control command for the distribution automation terminal devices, and transmitting the control command to the corresponding distribution automation terminal device.

The method may further include: synchronizing a main server with a backup server; calculating protection coordination correction values of the protective devices for system protection based on the event signal received when the main server malfunctions, detecting the fault section of the power distribution system based on the event signal, conducting real time system analysis using the field measurement data, transmitting control information including at least one of the detected protection coordination correction values of the protective device and the fault section system analysis information; and updating power distribution system information to the backup server when equipment of the power distribution system is added or changed, and synchronizing the power distribution system information with the main server.

The method may further include: synchronizing a database with a backup database; and storing the field measurement data and the event signal when the database malfunctions.

Advantageous Effects

According to an embodiment of the present invention having the above configuration, in a system and method for managing a power distribution system, when a fault signal occurs, a fault section can be precisely found and informed to the operator. Thereby, time required for fault section restoration can be reduced.

Furthermore, in the system and method for managing the power distribution system, when there is a change in the conditions of the system, for example, a change in topology, protection conditions of the system are checked. As needed, a protection coordination correction value is transmitted from a high level device. Therefore, adaptive protection coordination of the power distribution system is possible.

In addition, in the system and method for managing the power distribution system, current conditions of the power distribution system connected to distributed power can be precisely checked, and real time operation and control are possible.

Further, in the system and method for managing the power distribution system, 1:1 type synchronization measurement using IEC 61850 communication is conducted, rather than using a conventional 1:N type FEP. Therefore, measurement values can be synchronized.

Moreover, in the system and method for managing the power distribution system, a separate DCP server conducts a data processing function which has been conducted only by a main server in the conventional technique. Hence, time required for data processing can be reduced.

In the system and method for managing the power distribution system, real time system analysis and control can be conducted by periodic/non-periodic operation of a real time system analysis application. Thereby, despite rapid output fluctuation of the distributed power, the system management can be reliably realized.

Furthermore, in the system and method for managing the power distribution system, by virtue of dualization of a management and DB server, data synchronization (mirroring), maintenance and repair of the system are possible without interrupting the system. Storing the history data, equipment data, etc., the database has a dualized structure including the database and the backup database. Thus, the availability of the management system can be maximized.

BEST MODE

Figure 1:
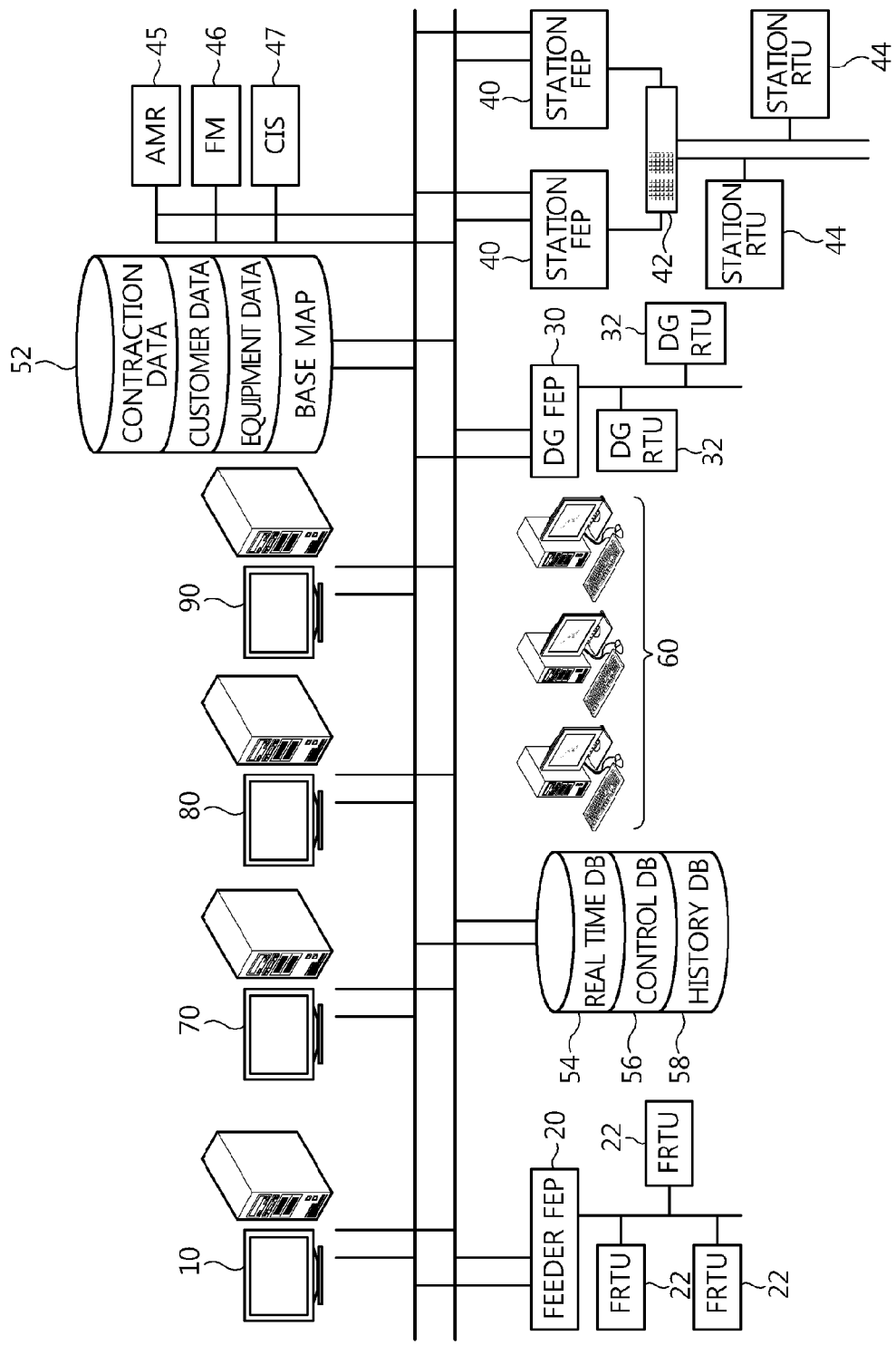
FIGS. 1 through 6 are views showing a conventional system for managing a power distribution system.
Figure 2:
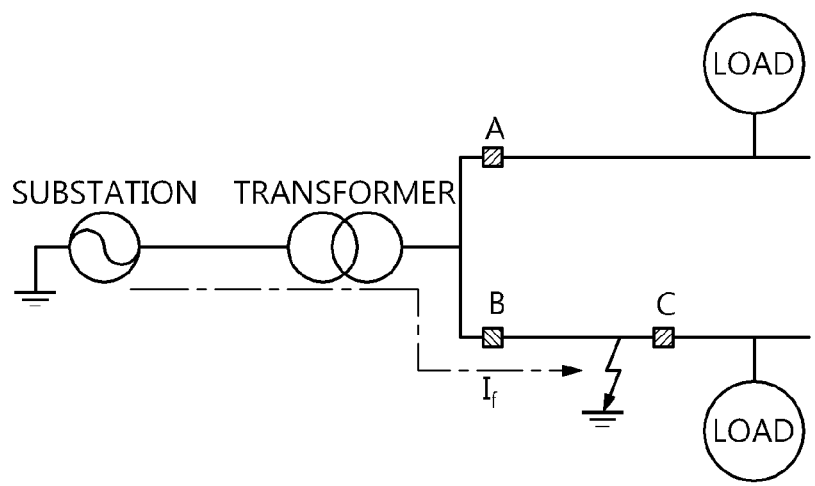
Figure 3:
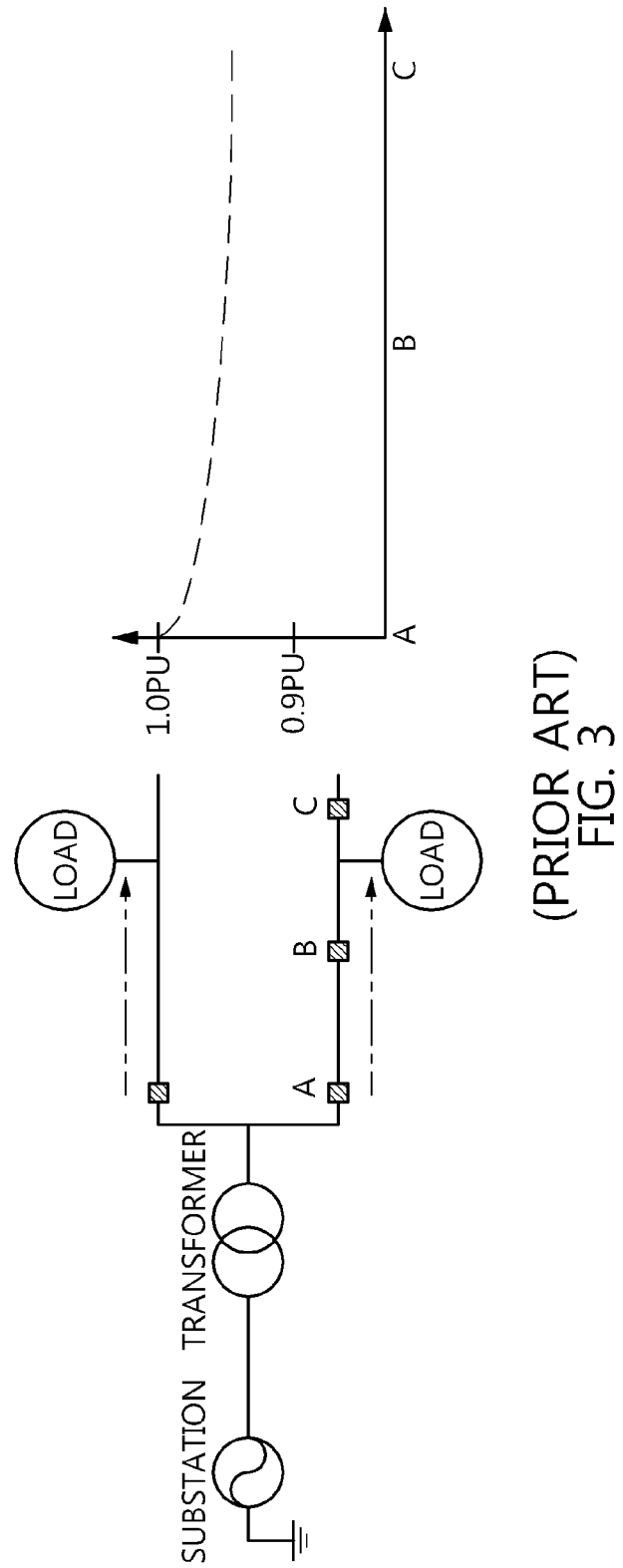
Figure 4:
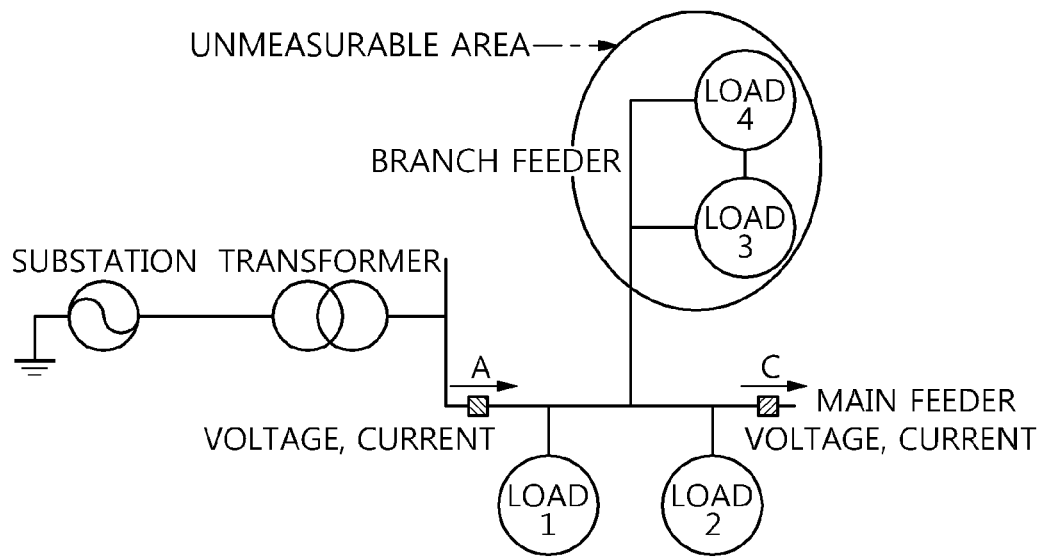
Figure 5:
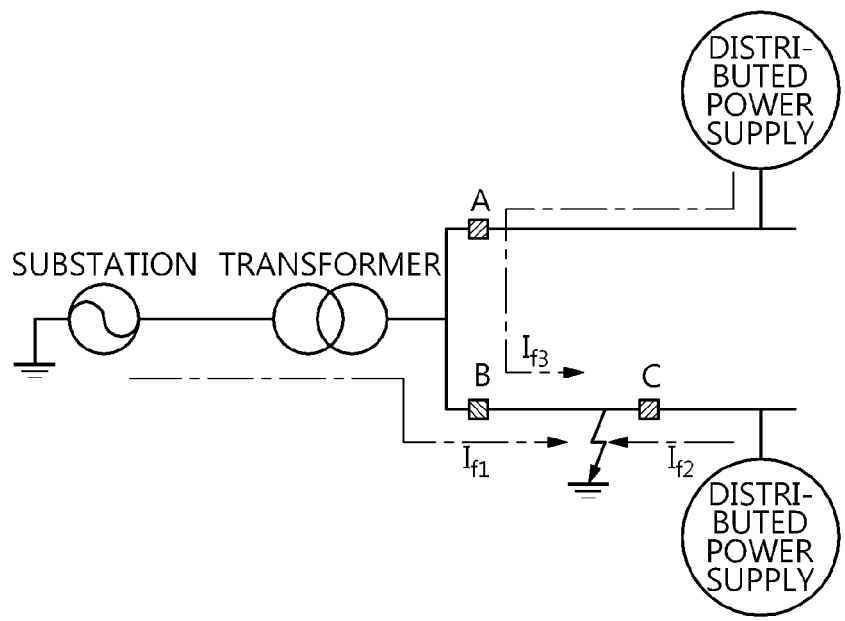
Figure 6:
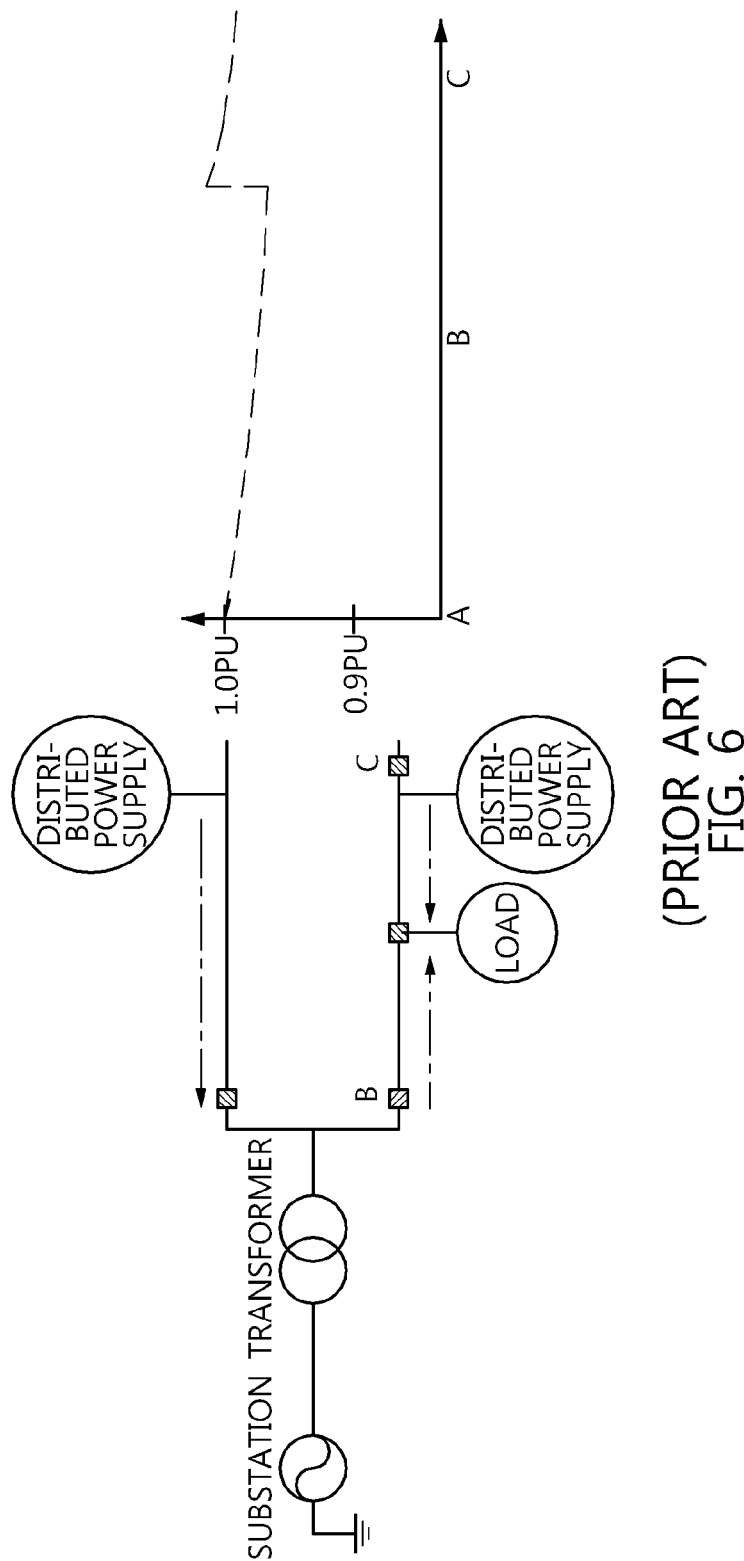

Hereinafter, an embodiment of the present invention will be described in detail with reference to the attached drawings such that those skilled in the art can easily implement an embodiment of the present invention. Reference now should be made to the drawings, in which the same reference numerals are used throughout the different drawings to designate the same or similar components. If in the specification, detailed descriptions of well-known functions or configurations would unnecessarily obfuscate the gist of an embodiment of the present invention, the detailed descriptions will be omitted.

Figure 7:
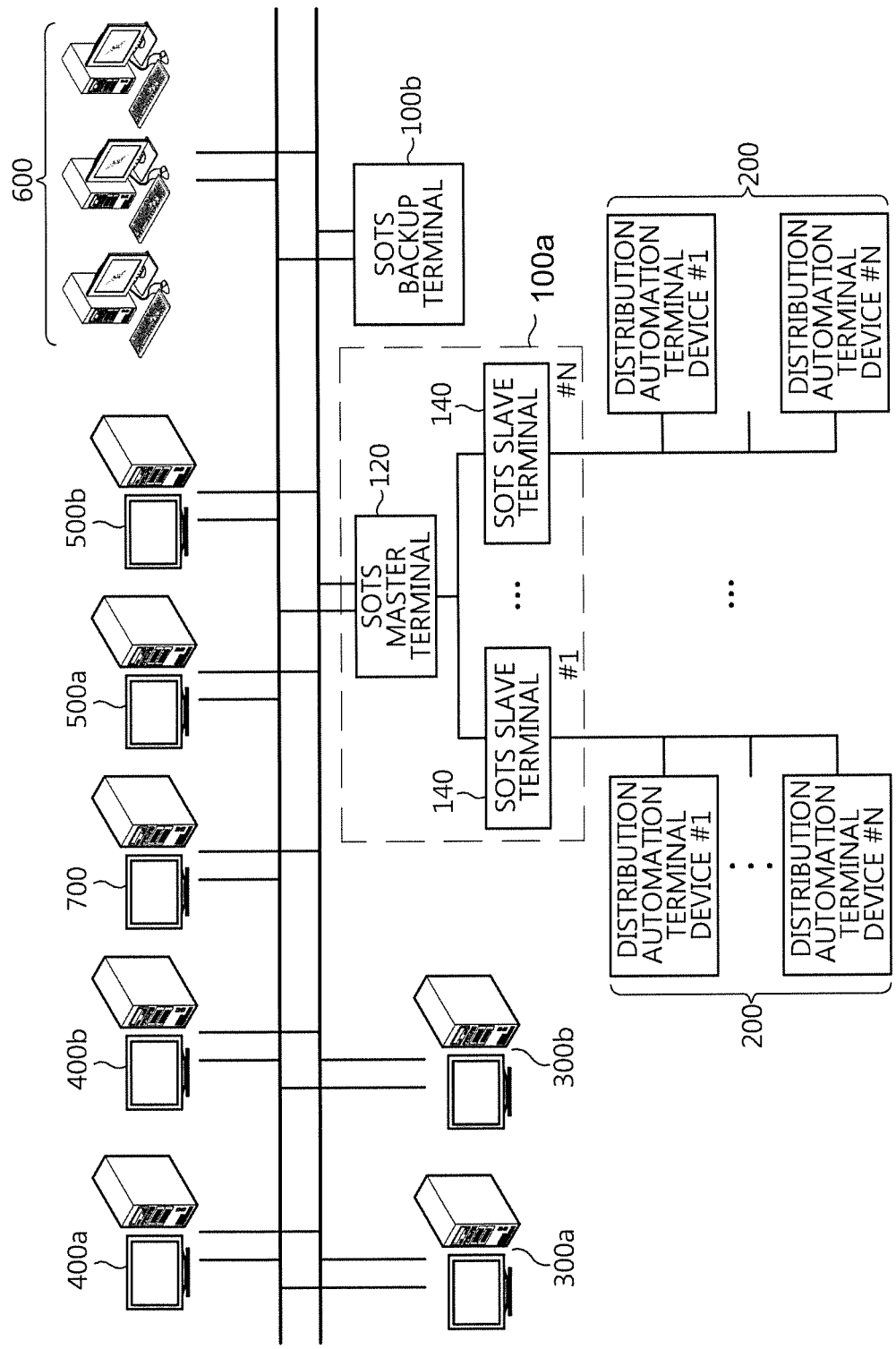
FIG. 7 is a view illustrating a system for managing a power distribution system according to an embodiment of the present invention.
Figure 8:
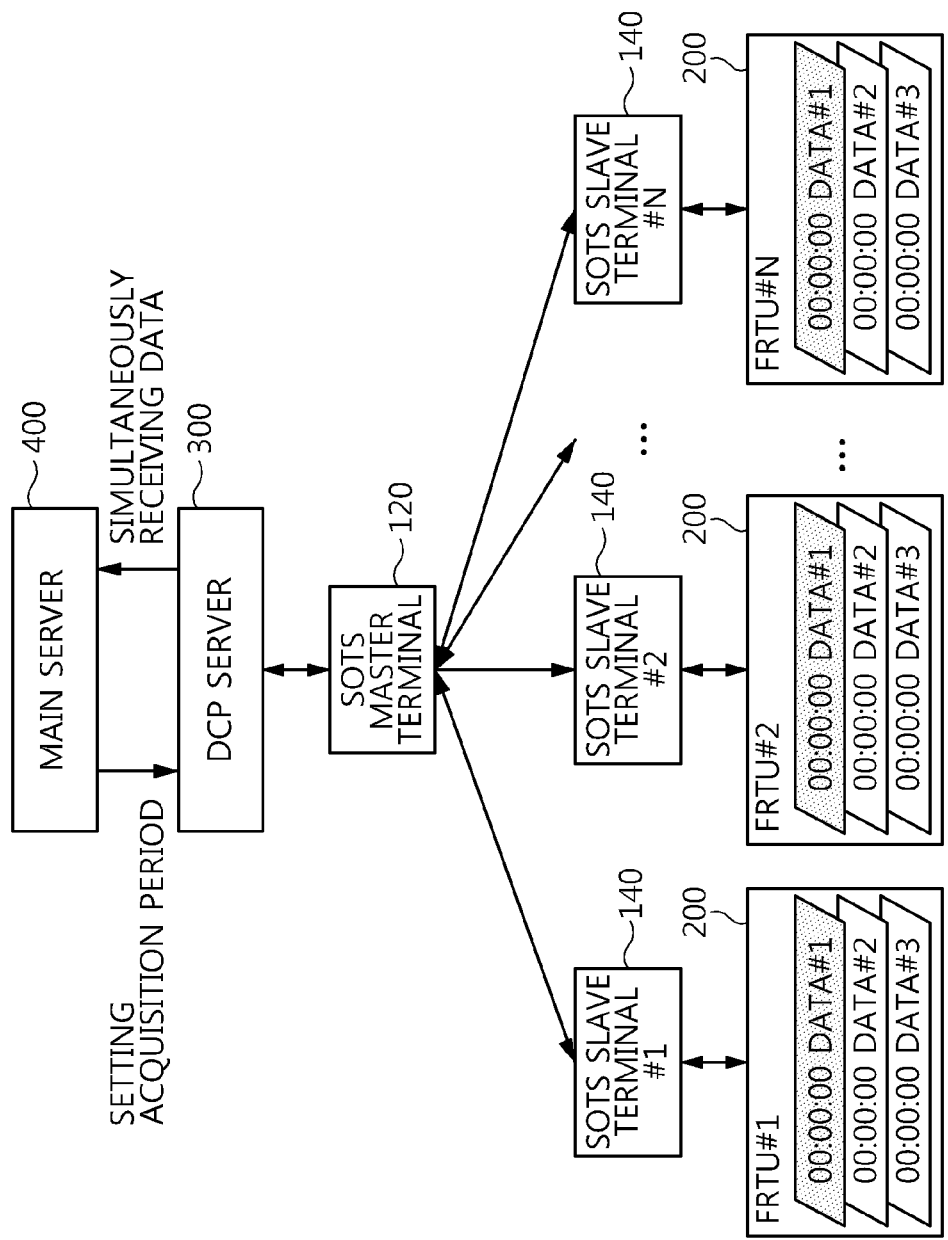
FIG. 8 is a view illustrating an SOTS terminal of FIG. 7.
Figure 9:
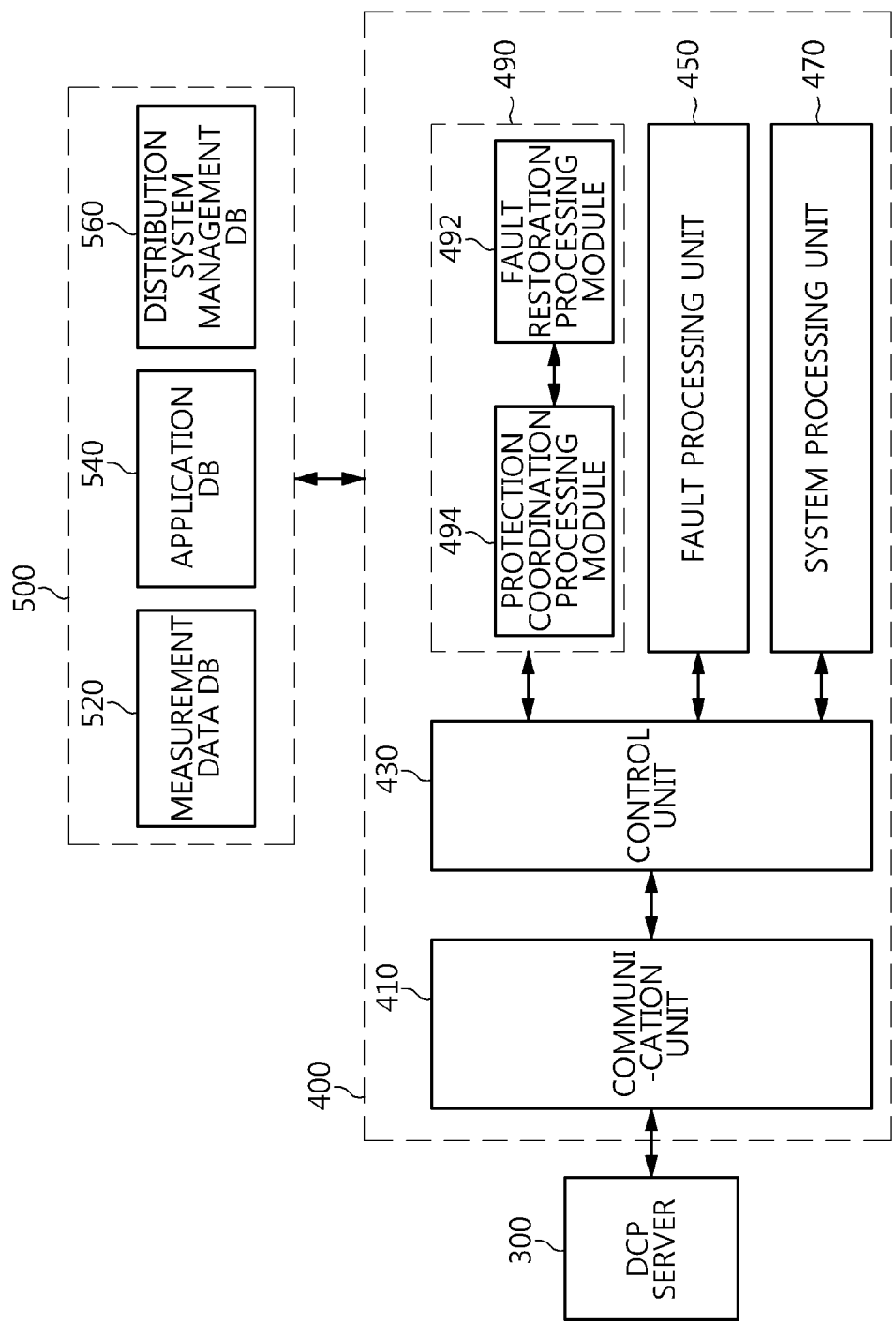
FIG. 9 is a view illustrating a main server of FIG. 7.
Figure 10:
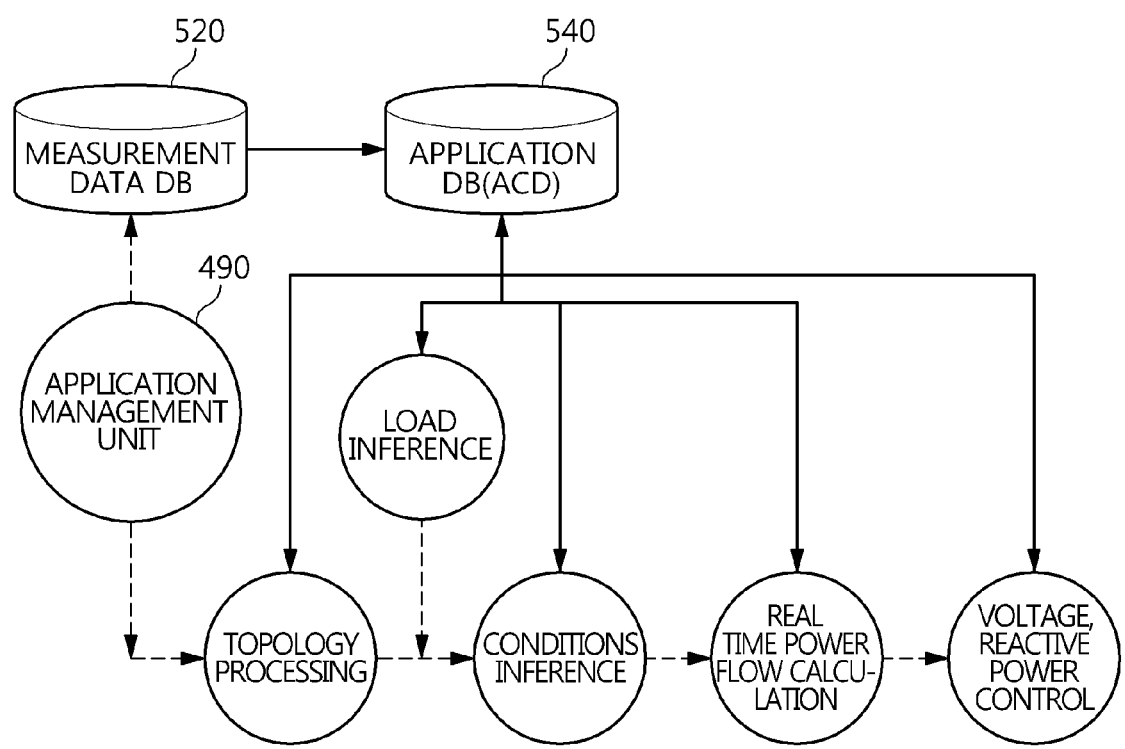
FIG. 10 is a view illustrating an application management unit of FIG. 7.
Figure 11:
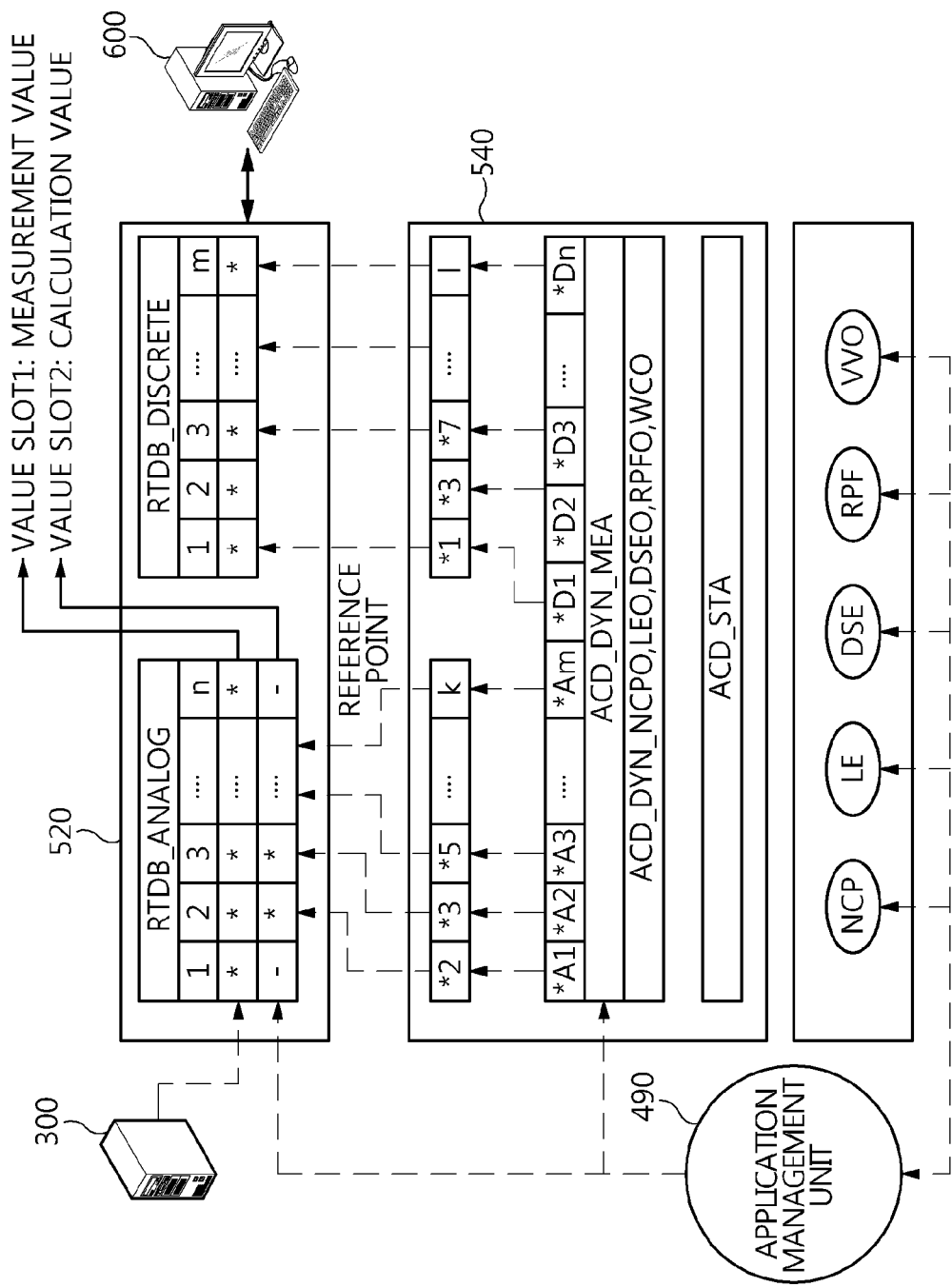
FIG. 11 is a view illustrating a database of FIG. 7.
Figure 12:
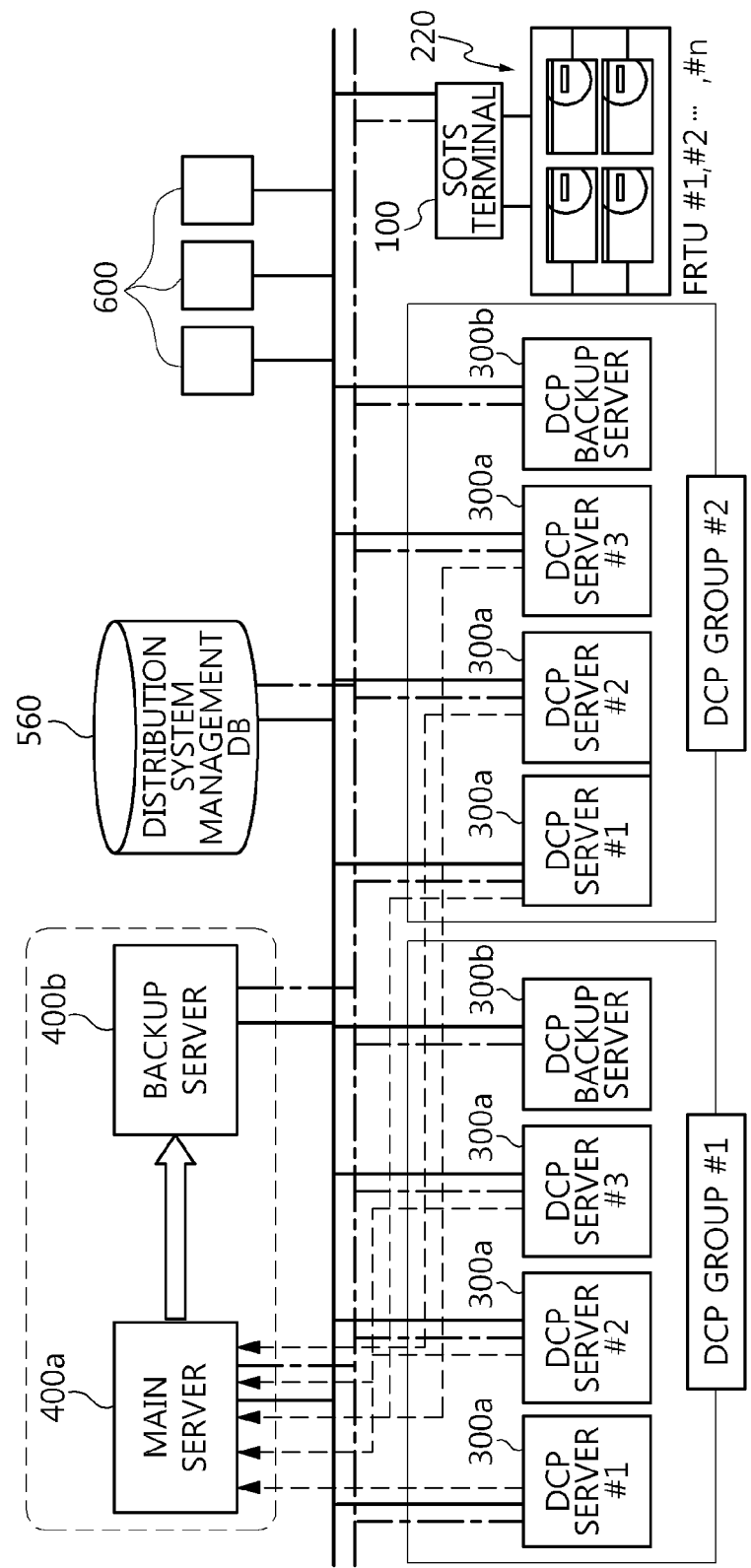
FIGS. 12 through 14 are views illustrating a duplex structure of the system for managing the power distribution system according to the embodiment of the present invention.
Figure 13:
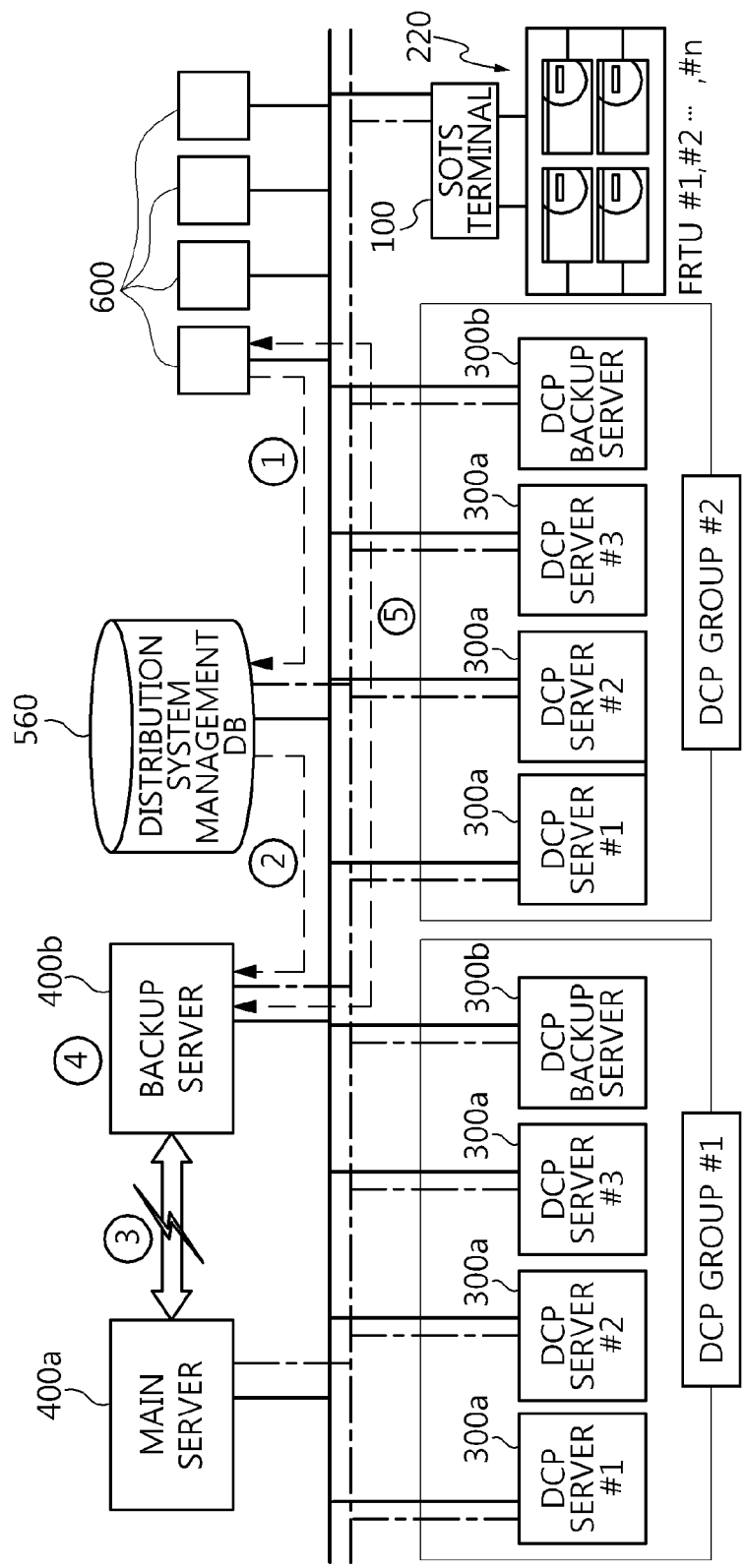
Figure 14:
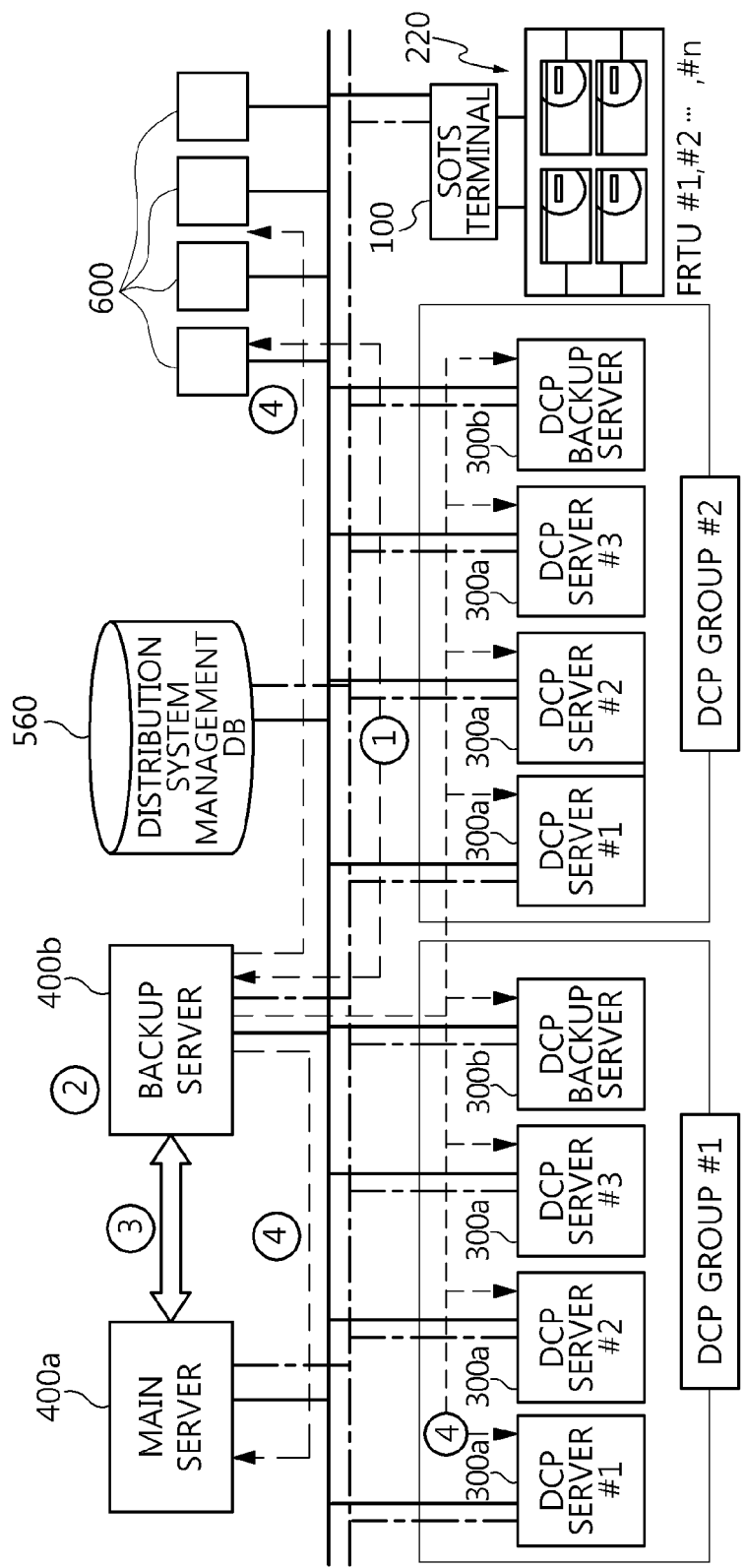

Hereinafter, a system for managing a power distribution system according to an embodiment of the present invention will be described in detail with reference to the attached drawings. FIG. 7 is a view illustrating the system for managing the power distribution system according to the embodiment of the present invention. FIG. 8 is a view illustrating an SOTS terminal of FIG. 7. FIG. 9 is a view illustrating a main server of FIG. 7. FIG. 10 is a view illustrating an application management unit of FIG. 7. FIG. 11 is a view illustrating a database of FIG. 7. FIGS. 12 through 14 are views illustrating a duplex structure of the system for managing the power distribution system according to the embodiment of the present invention.

As shown in FIG. 7, the system for managing the power distribution system includes an SOTS terminal 100a, an SOTS backup terminal 100b, a DCP server 300a, a DCP backup server 300b, a main server 400a, a backup server 400b, a database 500a, a backup database 500b, an operator terminal 600 and a GIS server 700. The operator terminal 600 and the GIS server 700 conduct the same functions as those of the conventional system for managing a power distribution system, so that further explanation thereof will be omitted.

The SOTS terminal 100a collects field measurement data and an event signal from a plurality of distribution automation terminal devices 200 which are respectively provided on a plurality of protective devices that are provided on lines between a substation, a transformer and a load. Here, the SOTS terminal 100a collects field measurement data measured by the distribution automation terminal devices 200 at the same time. For this, the SOTS terminal 100a includes an SOTS master terminal 120 and a plurality of SOTS slave terminals 140. The SOTS master terminal 120 and the SOTS slave terminals 140 are configured to include communication terminals which conduct IEC 61850 communication.

The SOTS master terminal 120 receives field measurement data collected by the SOTS slave terminals 140. The SOTS master terminal 120 transmits the received field measurement data to the main server 400a. In addition, the SOTS master terminal 120 transmits control information received from the main server 400a to the SOTS slave terminals 140 which are connected to the corresponding distribution automation terminal devices 200.

Each SOTS slave terminal 140 is connected to the distribution automation terminal devices 200. The SOTS slave terminal 140 collects field measurement data measured by the distribution automation terminal devices 200 at the same time. The SOTS slave terminals 140 transmit the collected field measurement data to the SOTS master terminal 120. Each SOTS slave terminal 140 transmits a control command received from the SOTS master terminal 120 to the corresponding distribution automation terminal devices 200. Here, for real time periodic system analysis in the management of the power distribution system, synchronized data is required. In the conventional system for managing a power distribution system, desynchronization of data is caused because of a successive polling type FEP-distribution automation terminal device structure of 1:N. On the other hand, in the system for managing the power distribution system according to an embodiment of the present invention, a the DCP server 300a—the SOTS master terminal 120—the distribution automation terminal device 200 structure of 1:1 is configured using IEC 61850 communication to conduct real time measurement of synchronized data. That is, as shown in FIG. 8, the DCP server 300a collects field measurement data at regular time intervals designated by the main server 400a. The DCP server 300a collects field measurement data from the distribution automation terminal devices 200 through the SOTS master terminals 120 at the same time. At this time, the distribution automation terminal devices 200 acquire measurement data of the same time zone based on the absolute time and store it. The distribution automation terminal devices 200 that have received the acquisition signals transmit field measurement data to the DCP server 300a via the SOTS slave terminals 140 and the SOTS master terminal 120. The transmitted field measurement data is transmitted to the main server 400a.

The SOTS backup terminal 100b synchronizes data with the SOTS terminal 100a. When the SOTS terminal 100a malfunctions, the SOTS backup terminal 100b collects, through changeover, both field measurement data that is measured at the same time by the distribution automation terminal devices 200 provided in the respective protective devices and an event signal generated from the distribution automation terminal devices 200 and transmits them to the DCP server 300a. In other words, when a fault of the SOTS terminal 100a is induced, in lieu of the SOTS terminal 100a, the SOTS backup terminal 100b conducts, through the changeover, the function that has been governed by the SOTS terminal 100a.

The DCP server 300a receives measurement data and an event signal from the SOTS terminal 100a. The DCP server 300a transmits the received measurement data and event signal to the main server 400a. In addition, the DCP server 300a receives control commands for the distribution automation terminal devices 200 from the main server 400a. The DCP server 300a transmits the received control commands to the corresponding distribution automation terminal devices 200. That is, the DCP server 300a transmits the control commands to the SOTS terminal 100a that is connected to the distribution automation terminal devices 200 corresponding to the control commands. The DCP server 300a may transmit and receive data to and from the backup server 400b and the backup SOTS when a fault of the main server 400a or the SOTS terminal 100a occurs or a change such as addition of a protective device is made in the power distribution system.

The DCP backup server 300b synchronizes data with the DCP server 300a. When the DCP server 300a malfunctions, the DCP backup server 300b receives, through changeover, field measurement data and an event signal from the SOTS terminal 100a. The DCP backup server 300b also receives control commands for the distribution automation terminal devices 200 from the main server 400a and transmits them to the corresponding distribution automation terminal devices 200. In other words, when the DCP server 300a malfunctions, in lieu of the DCP server 300a, the DCP backup server 300b conducts, through the changeover, the function that has been governed by the DCP server 300a.

Based on an event signal received from the DCP server 300a, the main server 400a determines protection coordination correction values of the protective devices to protect the system and detects a fault section of the power distribution system. The main server 400a conducts real time system analysis using the field measurement data. The main server 400a transmits control information including at least one among the protection coordination correction values, the fault section and the system analysis information to the DCP server 300a. For this, as shown in FIG. 9, the main server 400a includes a communication unit 410, a control unit 430, a fault processing unit 450, a system processing unit 470 and an application management unit 490.

The communication unit 410 receives the field measurement data and the event signal from the DCP server 300a. The communication unit 410 transmits control information including at least one among the protection coordination correction value, the fault section and the system analysis information to the DCP server 300a.

The control unit 430 generates control commands for detection of a fault section, restoration of the fault and protection coordination control. When the event signal contains a fault indication signal, the control unit 430 generates a control command to detect a fault section of the power distribution system. When a fault section of the power distribution system is detected in the fault processing unit 450, the control unit 430 generates a control command to restore the fault. Further, the control unit 430 generates a protection coordination control command when a topology change signal is contained in the event signal.

When the control unit 430 generates a control command for detection of a fault section, the fault processing unit 450 uses a fuzzy inference method and a center-of-gravity method and detects the fault section of the power distribution system. In detail, the fault processing unit 450 uses a conditional membership function and fuzzifies a physical size for image current of a switch that is contained in the fault indication signal, thus creating fuzzy data. Furthermore, based on the created fuzzy data and a fuzzy rule, the fault processing unit 450 performs fuzzy inference using min-max composition, thus creating fuzzy inference data. In addition, using the fuzzy inference data, the fault processing unit 450 calculates the area of a consequent function corresponding to a component value set in each section of the power distribution system. Using the center-of-gravity method, the fault processing unit 450 calculates the center of gravity of the calculated area of each section. Among the calculated centers of gravity of the sections, the fault processing unit 450 determines, as a fault section, the section that has the largest center of gravity. The operation in which the fault processing unit 450 detects a fault section is as follows.

First, input physical image current size data (A or kA) of the switch (a pair of switches including a power supply side switch and a load side switch of each section) is fuzzified (to be a value between 0 and 1). Because a reference value used to determine that the size of image current is large, normal or small is ambiguous, the conditional membership function is used to calculate how much of the input value of image current belongs to each of 'large', 'small' and 'normal'. Here, fuzzy membership functions are classified into a conditional membership function and a consequent membership function. The conditional membership function is a function to calculate fuzzy membership values for the input image currents of the power supply side switch and the load side switch. Elements of the conditional membership function are set as 'small', 'medium' and 'big'. These mean that the size of the image current is small, middle and large. The consequent membership function is a membership function for fuzzy inference so as to calculate a final composition membership value using the power supply side membership value and the load side membership value.

The fault processing unit 450 compares image current of the power supply side switch with image current of the load side switch and determines a section, in which a different therebetween is comparatively large, as a fault section. Therefore, a fuzzy rule is required to determine conditions of each section from comparison between the image currents of the power supply side switch and the load side switch. The fuzzy rule is made from the following references. If the image current of the power supply side switch is large and the image current of the load side switch is small, there is high probability that the section is a fault section. If the image current of the power supply side switch is normal and the image current of the load side switch is small, there is medium probability that the section is a fault section. If the image current of the power supply side switch is small and the image current of the load side switch is small, there is low probability that the section is a fault section. In all cases other than the above conditions, there is low probability that the section is a fault section. The fault processing unit 450 compares the fuzzified data with the fuzzy rule and conducts fuzzy inference using the min-max composition. The fault processing unit 450 compares fuzzy data for the size of the image current of the power supply side switch of the corresponding section with fuzzy data for the size of the image current of the load side switch (determines how much the fuzzy data belongs to each of 'large', 'small' and 'normal'). Among the fuzzy data, the fault processing unit 450 applies the smallest value to the fuzzy rule, thus determining which one value of the consequent membership function ('good', 'normal' and 'bad') that the input value belongs to. Also, the fault processing unit 450 determines the area of the section using the maximum value among values by elements of the consequent membership function. The elements of the consequent membership function are 'low', 'medium' and 'big'. These elements mean that the probability of the corresponding section being a fault section is 'low', 'medium' and 'high', respectively.

Using the center-of-gravity method, the fault processing unit 450 calculates a center point of the area formed through the fuzzy inference. The fault processing unit 450 determines the maximum value of calculated results as a fault section. Here, the center of gravity of the area can be calculated by the following equation 1.

$$\text{center of gravity} = \frac{\sum_{i=1}^{n} f(x_i) \times x_i}{\sum_{i=1}^{n} f(x_1)} \quad \text{[Equation 1]}$$

Here, $x_i$ denotes an x-axial value of the consequent fuzzy membership function that has a deviation of $\Delta x$. Further, $f(x_i)$ denotes a y-axial value of the consequent fuzzy membership function that corresponds to $x_i$. After the fault section determination process is conducted, the result thereof is stored in the database 500a.

When a real time system analysis control command is generated from the control unit 430, the system processing unit 470 conducts real time system analysis using the field measurement data that are measured the same time and synchronized. That is, as shown in FIG. 10, the system processing unit 470 creates electrical busbars and independent systems based on a current system topology. The system processing unit 470 infers a load of each section of the created independent systems based on the field measurement data. The system processing unit 470 calculates a voltage, a phase and a power inflow rate of each created busbar. The system processing unit 470 creates a base case based on the section load, the voltage, the phase and the power inflow rate. Based on the created base case, the system processing unit 470 conducts voltage and reactive power control and performs a voltage violation removal operation and a loss minimizing operation. Here, if there is no violation, the system processing unit 470 performs the loss minimizing operation. If there is violation, for example, in voltage, load, power factor, etc., and it can be removed, the system processing unit 470 performs the violation removal operation. If there is violation, e.g., in voltage, load, power factor, etc., and it cannot be removed, the system processing unit 470 performs a violation minimizing operation.

When the control unit 430 creates a protection coordination control command, the application management unit 490 detects protection coordination correction values of the protective devices for the all independent systems of the power distribution system and transmits them to the DCP server 300a. When a fault restoration control command for a fault section detected by the fault processing unit 450 is created, the application management unit 490 creates a switch operation list of the distribution automation terminal device 200 that corresponds to the detected fault section. The application management unit 490 transmits a control command including the created switch operation list to the DCP server 300a through the communication unit 410. For this, the application management unit 490 includes a protection coordination processing module 494 and a fault restoration processing module 492.

If the event signal includes a topology change signal, the protection coordination processing module 494 conducts fault calculation of the all independent systems of the power distribution system. Based on preset references, the protection coordination processing module 494 uses at least one among a current value, the maximum value and load pattern data at a specific point of time to change load data. Using the changed load data, the protection coordination processing module 494 conducts power flow calculation of the independent systems to which the respective switches belong, thus calculating protection capacities of the corresponding systems. The protection coordination processing module 494 calculates the protection capacity from the following equation 2.

$$\text{protection capacity} = \frac{\sum_{i=1}^{N_{Rij}} \sum_{j=1}^{N_{PE}} w_{ij}}{\sum_{i=1}^{N_{Rij}} \sum_{j=1}^{N_{PE}} 1} \times 100[\%] \quad \text{[Equation 2]}$$

Here, $i$, $j$, $N_{Rij}$ and $N_{PE}$ respectively denote an i-th protective device, a j-th protective element, the number of protective devices and the number of protective elements of the independent system. $W_{ij}$ denotes suitability of a correction element of the j-th protective element of the i-th protective device. When a correction reference is satisfied, $W_{ij}$ is 1, and when it is not satisfied, $W_{ij}$ is 0. Therefore, for example, if the protection capacity is 97%, it means that 3% of the protective elements of the all protective devices are contrary to the correction reference.

If the protection capacity of each independent system is a reference value or more, the protection coordination processing module 494 stores the protection capacity in the database 500a. That is, after the calculation for the all switches has been completed, the protection coordination processing module 494 determines whether each independent system in which an event signal occurs is contrary to a reference value, and then stores the result in the database 500a if it is not contrary to the reference value.

If the protection capacity of each independent system is less than the reference value and is in a protection coordination section using communication, the protection coordination processing module 494 receives initial IP addresses of the protective devices of the corresponding independent system, conducts a topology test, identifies a pair of protective devices to transmit and receive communication signals, and creates a final IP address list. If the protection capacity of each independent system is less than the reference value but is not in the protection coordination section using communication, the protection coordination processing module 494 receives a current protection coordination correction value and characteristic data of the protective device of the corresponding independent system and conducts overcurrent protection coordination correction according to a correction rule, thus calculating a protection coordination correction value. The protection coordination processing module 494 transmits the IP address list or the protection coordination correction value to the protective device through the DCP server 300a. Further, the protection coordination processing module 494 stores the IP address list or the protection coordination correction value in the database 500a.

Based on the detected fault section, the fault restoration processing module 492 creates a switch operation list of the distribution automation terminal device 200 that corresponds to the fault section. The fault restoration processing module 492 transmits a control command including the created switch operation list to the DCP server 300a through the communication unit 410.

The backup server 400 synchronizes data with the main server 400a. Based on the event signal received from the DCP server 300a when a fault of the main server 400a occurs, the backup server 400b detects protection coordination correction values of the protective devices for protection of the system and a fault section of the power distribution system. The backup server 400b conducts real time system analysis using the field measurement data. The backup server 400b transmits control information including at least one among the calculated protection coordination correction values of the protective devices, the correction values, the fault section and system analysis information to the DCP server 300a. In other words, when a fault of the main server 400a occurs, in lieu of the main server 400a, the backup server 400b conducts, through changeover, the function that has been governed by the main server 400a.

When equipment is added to the power distribution system or there is a change in the power distribution system, the backup server 400b updates distribution system information and synchronizes the power distribution system information with that of the main server 400a. Here, the backup server 400b may be operated as the main server 400a through changeover after updating the power distribution system information input through an HMI of the operator terminal 600. That is, the existing main server 400a is operated as the backup server 400b, and the existing backup server 400b is operated as the main server 400a.

The database 500a stores at least one among the field measurement data, the event signal, the protection coordination correction value, the fault section and the system analysis information which are received from the main server 400a. For this, the database 500a includes a measurement data DB 520 which stores field measurement data received from the DCP server 300a, and an application DB 540 which stores load inference, condition inference, power flow calculation, voltage, reactive power and topology created using the field measurement data. The application DB 540 synchronizes data with the measurement data DB 520. For this, the application DB 540 includes a data mapping table for data synchronization with the measurement data DB 520. Based on the data mapping table, the application DB 540 receives field measurement data stored in the measurement data DB 520 and stores it therein. Furthermore, based on the data mapping table, the application DB 540 stores the topology, the load inference, the condition inference, the power flow calculation, the voltage and the reactive power in the measurement data DB 520. As shown in FIG. 11, the field measurement data measured by the distribution automation terminal device 200 is stored in the measurement data DB 520 (that is, a value slot 1) through the DCP server 300a. The application management unit copies the field measurement data stored in the measurement data DB 520 to the application DB according to a performance period (for example, every one minute, five minutes, etc.) of the system control (that is, fault section detection, real time system analysis, protection coordination correction calculation, etc.). For this, the application DB includes a data mapping table for storage points of the measurement data DB 520. After the field measurement data is stored in the application DB, the application management unit conducts control of topology, load inference, condition inference, power flow calculation, voltage and reactive power. The application management unit stores results of system control in the application DB. In addition, the application management unit copies the results of the system control as an application result (that is, to a value slot 2) of the measurement data DB 520 using a data mapping table for RTDB data point. Here, an operator can check the stored field measurement data and the system control results through the operator terminal 600.

The database further includes a distribution system management DB 560 which stores and manages history data, equipment data, system diagram data, etc. The power distribution system management DB 560 is operated in an offline state. If there is addition, deletion or change of equipment of the power distribution system, the power distribution system management DB 560 changes the corresponding data.

The backup database 500b synchronizes data with the database 500a. When a fault occurs in the database 500a, the backup database 500b stores field measurement data and an event signal. For this, the backup database 500b includes a measurement data DB 520 and an application DB 540, in the same manner as that of the database 500a.

As shown in FIG. 12, in the system for managing the power distribution system, the main server 400a is dualized by the backup server 400b, and the DCP server 300a is dualized to have a backup structure of N:1 in each group. Here, the main server 400a, the backup server 400b, n number of DCP servers 300a and DCP backup servers 300b synchronize data without using a separate external controller. Each DCP server 300a collects measurement data obtained from the distribution automation terminal devices 200 and transmits the measurement data to the main server 400a. The main server 400a synchronizes data between it and the backup server 400b in real time so that when the main server 400a malfunctions, time required for changeover of the system can be minimized Here, the DCP servers 300a are operated in an N:1 backup manner in each group so as to enhance the management efficiency of the system.

The power distribution system management DB 560 which stores and manages the history DB, the equipment DB, the system diagram data, etc. is configured for offline use to avoid disrupting the real time system management.

After data for management of the power distribution system is input, necessary data is individuated into file type PDB by extract instruction in the backup server 400b and is reflected in the management of the system. An update process of the system for managing the power distribution system when new equipment or the like is added will be explained with reference to FIGS. 13 and 14. First, in the power distribution system management DB 560 that is in the offline state, edition of the database 500a and the system diagram is conducted in response to the addition of the new equipment (refer to ① of FIG. 13). At this time, using the operator terminal 600, the operator conducts editing of the database 500a and the system diagram. After the editing has been completed, when the backup server 400b generates a PDB creation command, the power distribution system management DB 560 creates PDB and transmits it to the backup server 400b (refer to ② of FIG. 13). The backup server 400b ends the synchronization with the main server 400a (refer to ③ of FIG. 13) and is converted into a disabled state (refer to ④ of FIG. 13). The backup server 400b is connected to extra operator terminals 600 and extra DCP servers 300a and is operated in a single mode (refer to ⑤ of FIG. 13). Here, through the operation in single mode, the backup server 400b tests the operation conditions of the system for managing the power distribution system in response to addition of the new equipment. If the operation conditions are normal, the backup server 400b exits the single mode (refer to ① of FIG. 14) and is converted into an enabled state (refer to ② of FIG. 14). The main server 400a and the backup server 400b are changed with each other by changeover between the main server 400a and the backup server 400b (refer to ③ of FIG. 14). In other words, the existing main server 400a is changed into the backup server 400b, and the existing backup server 400b is changed into the main server 400a. In the changed main server 400a, all nodes and operator terminals 600 update new PDB and system diagram files and synchronize them (refer to ④ of FIG. 14). When it is determined that all the systems are normal, synchronization between the main server 400a and the backup server 400b restarts.

As described above, in a system and method for managing a power distribution system, when a fault signal occurs, a fault section can be precisely found and informed to the operator. Thereby, time required for fault section restoration can be reduced.

Furthermore, in the system and method for managing the power distribution system, when there is a change in the conditions of the system, for example, a change in topology, protection conditions of the system are checked. As needed, a protection coordination correction value is transmitted from a high level device. Therefore, adaptive protection coordination of the power distribution system is possible.

In addition, in the system and method for managing the power distribution system, current conditions of the power distribution system connected to distributed power can be precisely checked, and real time operation and control are possible.

Further, in the system and method for managing the power distribution system, 1:1 type synchronization measurement using IEC 61850 communication is conducted, rather than using a conventional 1:N type FEP. Therefore, measurement values can be synchronized.

Moreover, in the system and method for managing the power distribution system, the separate DCP server 300a conducts a data processing function which has been conducted only by the main server 400a in the conventional technique. Hence, time required for data processing can be reduced.

In the system and method for managing the power distribution system, real time system analysis and control can be conducted by periodic/non-periodic operation of a real time system analysis application. Thereby, despite rapid output fluctuation of the distributed power, the system management can be reliably realized.

Furthermore, in the system and method for managing the power distribution system, by virtue of dualization of a management and DB server, data synchronization (mirroring), maintenance and repair of the system are possible without interrupting the system. Storing the history data, equipment data, etc., the database has a dualized structure including the database 500a and the backup database 500b. Thus, the availability of the management system can be maximized That is, in the conventional system for managing a power distribution system, when there is addition of new equipment or a change in the system, in other words, when it is required to change the power distribution system management DB 560 that is in the offline state, the operation of the main server 400a is interrupted. After the change has been completed, the main server 400a restarts. Unlike the conventional technique, in the system for managing the power distribution system according to an embodiment of the present invention, a change in the database 500a can be conducted without interrupting the system in such a way that after a change is applied to the backup server 400b, changeover between the main server 400a and the backup server 400b is carried out. Furthermore, in the conventional system for managing the power distribution system, when an SPF (single point fault) occurs, it is required to interrupt the entirety of the system. However, the system for managing the power distribution system according to an embodiment of the present invention is designed to have a dualized structure so that even when an SPF occurs, it is not required to interrupt of the entirety of the system. Therefore, compared to the conventional system for managing the power distribution system, the system according to an embodiment of the present invention is advantageous in that system availability for real time management and control can be increased.

Figure 15:
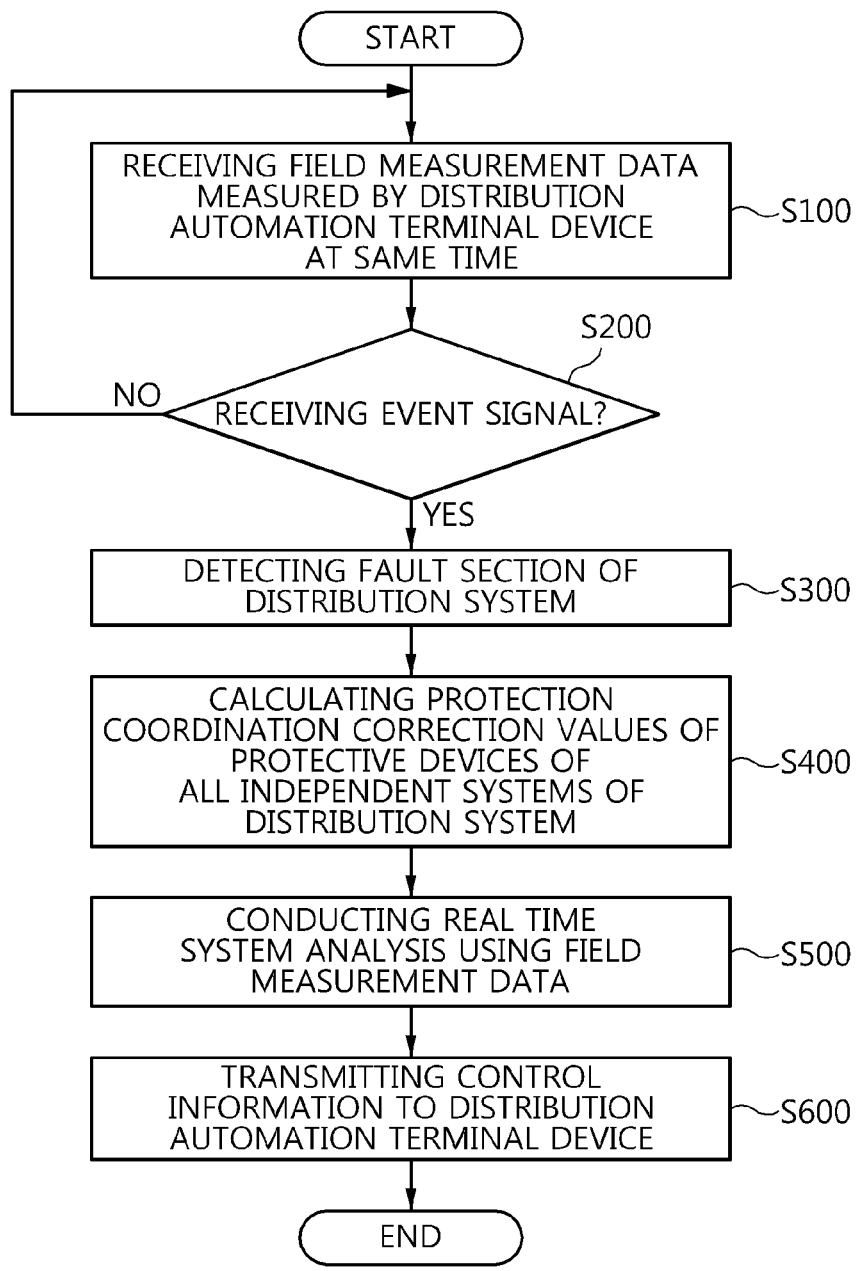
FIG. 15 is a flowchart of a method for managing a power distribution system according to an embodiment of the present invention.
Figure 16:
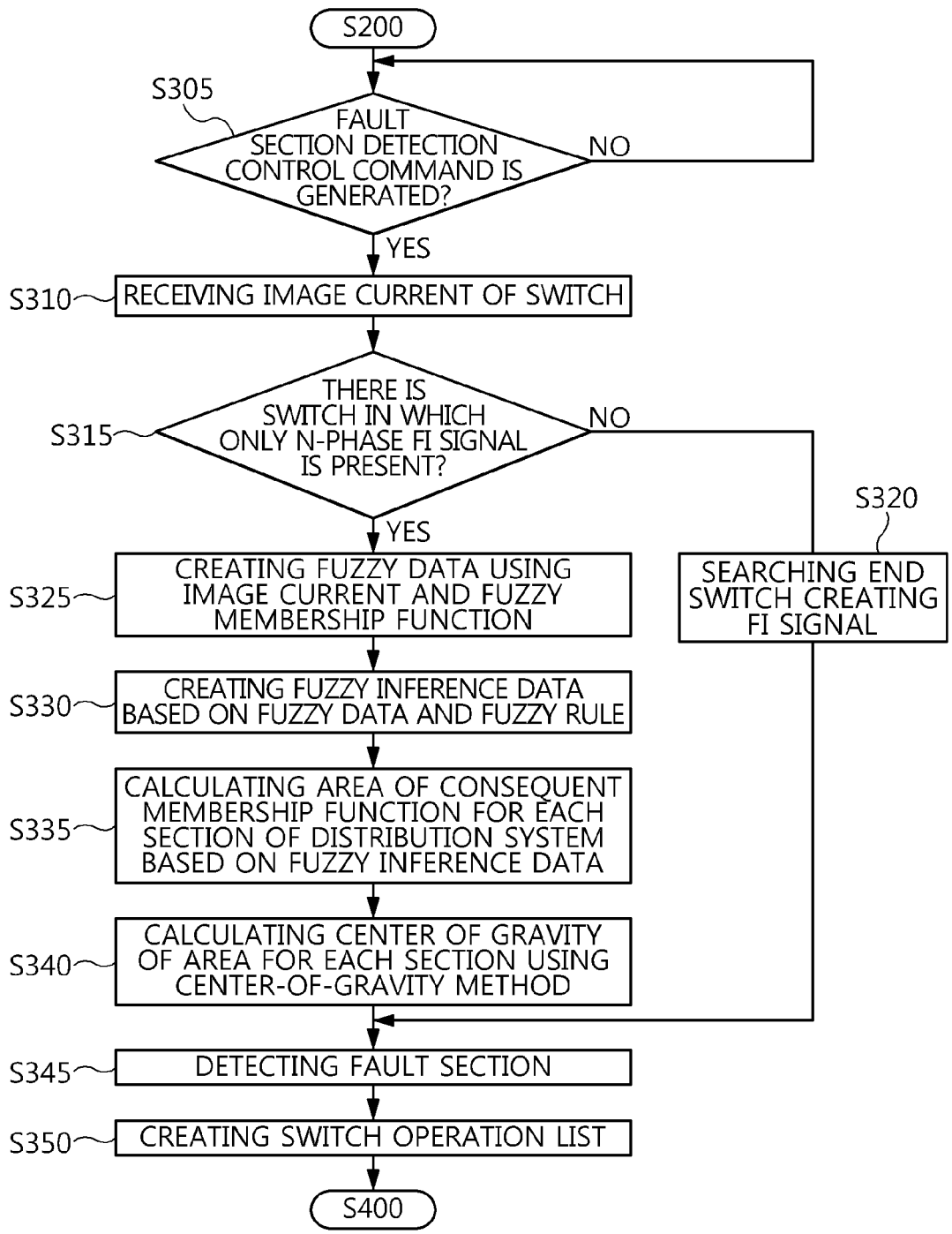
FIG. 16 is a flowchart illustrating the step of detecting a fault section of the power distribution system of FIG. 15.
Figure 17:
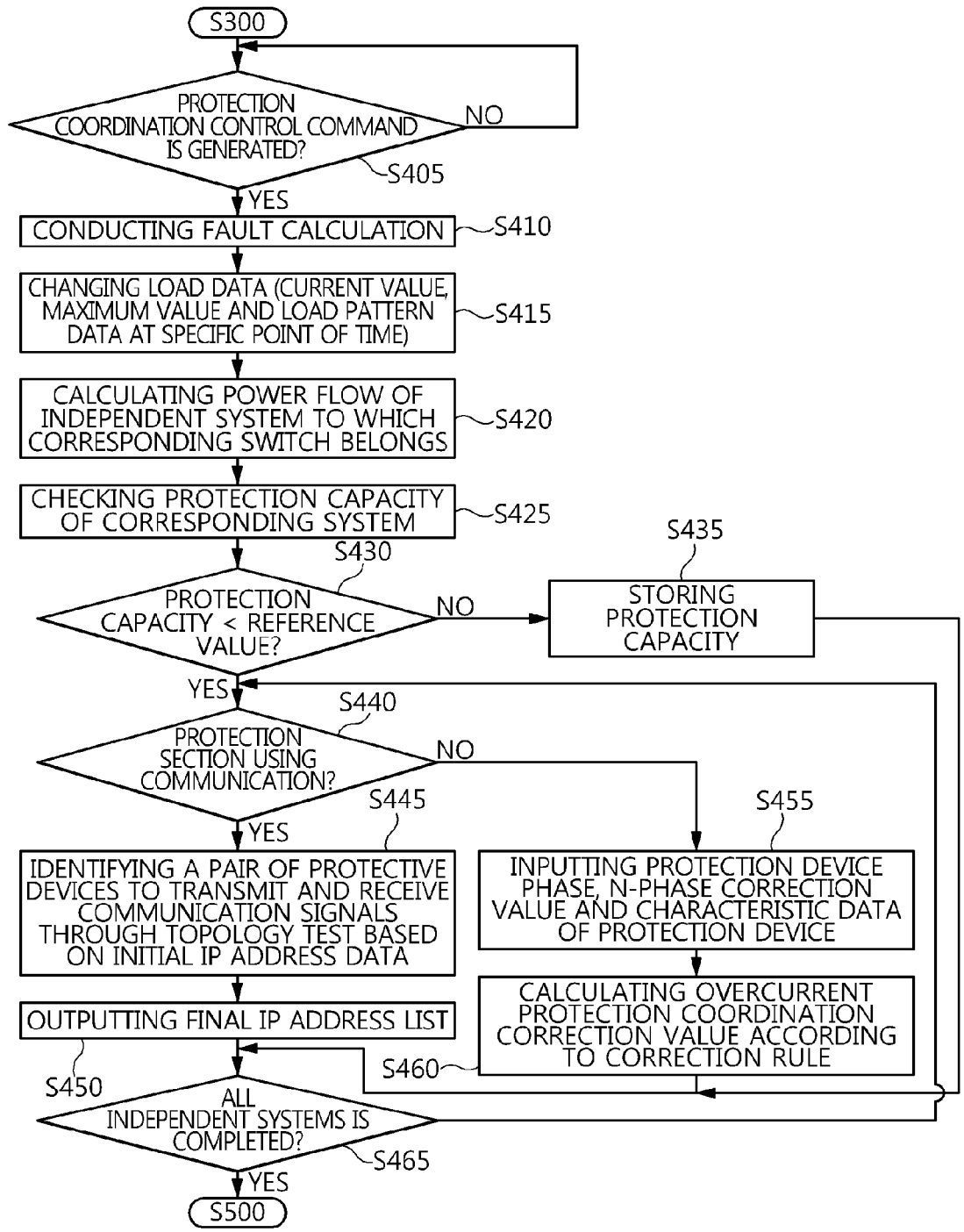
FIG. 17 is a flowchart illustrating the step of calculating a protection coordination correction value of FIG. 15.
Figure 18:
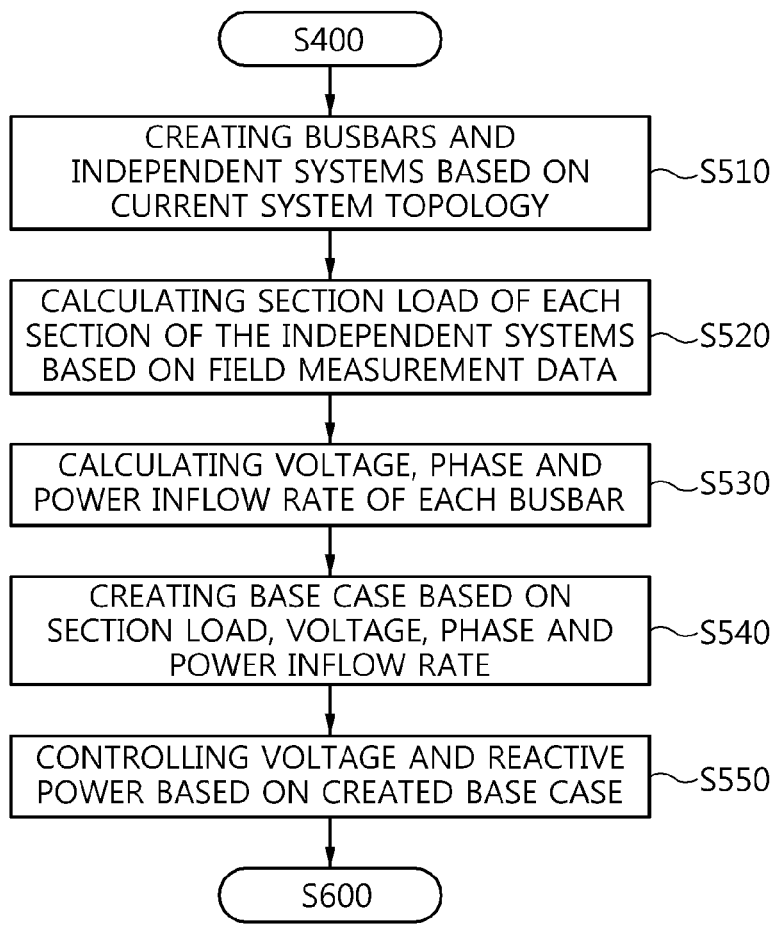
FIG. 18 is a flowchart illustrating a real time system analysis step of FIG. 15.

Hereinafter, a method for managing a power distribution system according to an embodiment of the present invention will be described in detail with reference to the attached drawings. FIG. 15 is a flowchart of the method for managing the power distribution system according to the embodiment of the present invention. FIG. 16 is a flowchart illustrating the step of detecting a fault section of the power distribution system of FIG. 15. FIG. 17 is a flowchart illustrating a step of calculating a protection coordination correction value of FIG. 15. FIG. 18 is a flowchart illustrating a real time system analysis step of FIG. 15.

The main server 400a receives field measurement data that is measured by the distribution automation terminal devices 200 at the same time (at step S100). The STOS terminal collects the field measurement data that is measured by the distribution automation terminal devices 200 at the same time and transmits the field measurement data to the DCP server 300a. The DCP server 300a transmits the received field measurement data to the main server 400a. The main server 400a stores the received field measurement data in the database 500a.

If an event signal generated from the distribution automation terminal devices 200 is received (at step S200; YES), the main server 400a detects a fault section of the power distribution system (at step S300). Below, the step of detecting the fault section will be described in detail with reference to the attached drawings.

If an FI signal is contained in the event signal and a fault section detection control command is generated (at step S305; YES), the main server 400a receives image current of the switches (at step S310). If there is no switch in which only N-phase FI signal is present (at step S315; NO), the main server 400a searches an end switch that has occurred the FI signal and detects it as a fault section (at step S320). If there is a switch in which only the N-phase FI signal is present (at step S315; YES), the main server 400a creates fuzzy data using image current and a fuzzy membership function (at step S325). The main server compares the created fuzzy data with the fuzzy rule and conducts fuzzy inference, thus creating fuzzy inference data (at step S330). Based on the created fuzzy inference data, the main server 400a calculates an area of a consequent membership function for each section of the power distribution system (at step S335). The main server 400a calculates the center of gravity of the created area for each section using the center-of-gravity method (at step S340). The main server 400a detects the fault section of the power distribution system based on the calculated center of gravity of each section (at step S345). Here, the main server 400a determines the section that has the largest center of gravity as the fault section of the power distribution system.

The main server 400a calculates protection coordination correction values of the protective devices of all the independent systems of the power distribution system (at step S400). Below, the step of calculating the protection coordination correction values will be explained in detail with reference to the attached drawings.

If a topology change signal is contained in the event signal and a protection coordination control command is generated (at step S405; YES), the main server 400a conducts fault calculation for the entirety of the power distribution system (at step S410). The main server 400a changes load data using the current value, the maximum value and the load pattern data at a specific point of time that are preset by the operator (at step S415).

The main server 400a conducts the power flow calculation in response to a load of the independent system to which the corresponding switch belongs (at step S420). In response to the result of the power flow calculation, the main server 400a checks the protection capacity of the corresponding system (at step S425). If the protection capacity is a reference value or more (at step S430; NO), because the protection capacity is not contrary to the reference value, the result is stored in the database 500a (at step S435).

If the protection capacity is the reference value or less and is in a protection section using communication (at step S440; YES), the main server 400a receives initial IP addresses of the protective devices that are in the section and conducts a topology test to identify a pair of protective devices to transmit and receive communication signals (at step S445). The main server 400a outputs a final IP address list (at step S450). If the protection capacity is the reference value or less and is not in the protection section using communication (at step S440; NO), the main server 400a receives current correction values and characteristic data of the protective devices of the corresponding section (at step S455). The main server 400a conducts overcurrent protection coordination correction according to a correction rule and calculates a protection coordination correction value (at step S460). When the calculation of the protection coordination correction values for all the independent systems is completed (at step S465; YES), the main server 400a stores the result of the calculation in the database 500a and transmits the protection coordination correction values to the distribution automation terminal devices 200 that are installed in the corresponding protective devices.

The main server 400a conducts real time system analysis using the received field measurement data (at step S500). The real time system analysis step will be explained in detail with reference to the attached drawings.

The main server 400a creates busbars and independent systems based on the current system topology (at step S510). The main server 400a calculates a load of each section of the created independent systems based on the field measurement data (at step S520). The main server 400a calculates a voltage, a phase and a power inflow rate of each created busbar (at step S530). The main server 400a creates a base case based on the section load, the voltage, the phase and the power inflow rate (at step S540) and performs voltage and reactive power control based on the created base case (at step S550). That is, the main server 400a controls the voltage and reactive power and conducts a voltage violation removal and loss minimizing process. This process includes three operations. First, if there is no violation, the main server 400a performs the loss minimizing operation. If there is violation, for example, in voltage, load, power factor, etc., and it can be removed, the main server 400a performs the violation removal operation. If there is violation, e.g., in voltage, load, power factor, etc., and it cannot be removed, the main server 400a performs a violation minimizing operation.

The main server 400a transmits the fault section detection result, the protection coordination correction value and control information resulting from the real time system analysis to the distribution automation terminal device 200 (at step S600). In addition, the main server 400a transmits the control information to the DCP server 300a to which the corresponding distribution automation terminal device 200 is connected. The DCP server 300a transmits the received control information to the SOTS terminal 100a to which the corresponding distribution automation terminal device 200 is connected. The SOTS terminal 100a transmits the received control information to the corresponding distribution automation terminal device 200.

Although the preferred embodiment of the present invention has been disclosed for illustrative purposes, an embodiment of the present invention is not limited to the embodiment, and various modifications, additions and substitutions are possible, without departing from the scope and spirit of the invention.

The invention claimed is:

1. A system for managing a power distribution system, the power distribution system comprising a plurality of protective devices provided on lines between a substation, a transformer and a load, and a plurality of distribution automation terminal devices installed in the respective protective devices, the system comprising:

an SOTS terminal collecting field measurement data measured by the distribution automation terminal devices at a same time, and an event signal generated from the distribution automation terminal devices;

a DCP server receiving the field measurement data and the event signal from the SOTS terminal, receiving a control command for the distribution automation terminal devices, and transmitting the control command to corresponding distribution automation terminal devices;

a main server detecting protection coordination correction values of the protective devices for system protection and detecting a fault section of the power distribution system based on the event signal received from the DCP server, the main server conducting a real time system analysis using the field measurement data, and transmitting control information including at least one among the detected protection coordination correction values, the fault section and the system analysis information to the DCP server; and a database storing and managing at least one among the field measurement data, the event signal, the protection coordination correction values, the fault section and the system analysis information that are received from the main server.

2. The system as set forth in claim 1, wherein the main server comprises:

a communication unit receiving the field measurement data and the event signals from the DCP server, the communication unit transmitting control information including at least one among the protection coordination correction values, the fault section and the system analysis information to the DCP server;

a control unit generating a fault section detection control command for detection of the fault section of the power distribution system when the event signal contains a fault indication signal, and generating a fault restoration control command when the fault section of the power distribution system is detected, the control unit generating a protection coordination control command when the event signal contains a topology change signal;

a fault processing unit detecting the fault section of the power distribution system using a fuzzy inference method and a center-of-gravity method when the control unit generates the fault section detection control command; and an application management unit detecting the protection coordination correction values of the protective devices of all independent systems of the power distribution system when the control unit generates the protection coordination control command and then transmitting the protection coordination correction values to the DCP server, the application management unit creating, based on the detected fault section, a switch operation list of the distribution automation terminal device corresponding to the fault section when the control unit generates the fault restoration control command for the detect fault section, and transmitting the control command including the switch operation list to the DCP server through the communication unit.

3. The system as set forth in claim 2, further comprising:
a system processing unit conducting a real time system analysis, using the field measurement data that is measured and synchronized at the same time, when the control unit generates a real time system analysis control command.

4. The system as set forth in claim 3, wherein the system processing unit: creates electrical busbars and independent systems based on current system topology; infers a section load of each of sections of the independent systems based on field measurement data; calculates a voltage, a phase and a power inflow rate of each of the busbars; creates a base case based on the section load, the voltage, the phase and the power inflow rate; and conducts voltage and reactive power control based on the base case.

5. The system as set forth in claim 2, wherein the fault processing unit: fuzzifies, using a conditional membership function, a physical size for an image current of a switch that is contained in the fault indication signal, thus creating fuzzy data; conducts fuzzy inference using a min-max composition based on the fuzzy data and a fuzzy rule, thus creating fuzzy inference data; calculates, using the fuzzy inference data, an area of the consequent membership function corresponding to a component value set in each of the sections of the power distribution system; calculates, using the center-of-gravity method, a center of gravity of the calculated area of each section; and determines, as the fault section, the section that has a largest center of gravity among the calculated centers of gravity of the sections.

6. The system as set forth in claim 2, wherein the application management unit comprises:

a protection coordination processing module: conducting fault calculation for all the independent systems of the power distribution system when the event signal contains the topology change signal; changing load data using at least one among a current value, a maximum value and load pattern data at a specific point of time based on a preset reference value; conducting, using changed load data, power flow calculation of the independent systems to which respective switches belong and calculating a protection capacity of a corresponding system; storing the protection capacity in the database when the protection capacity of each of the independent systems is the reference value or more; when the protection capacity of each of the independent systems is the reference value or less and is in a protection coordination section providing communication between protective devices, receiving initial IP addresses of the protective devices of the corresponding independent systems and conducting a topology test to identify a pair of protective devices to transmit and receive communication signals, thus creating a final IP address list; when the protection capacity of each of the independent systems is the reference value or less and is not in a protection coordination section using communication between protective devices, receiving a current protection coordination correction value and characteristic data of a protective device of the corresponding independent system and conducting overcurrent protection coordination correction in response to a correction rule, thus calculating a protection coordination correction value; and transmitting the IP address list or the protection coordination correction value to the corresponding protective device through the DCP server and stores the final IP address list or the protection coordination correction value in the database; and a fault restoration processing module creating, based on the detected fault section, a switch operation list of the distribution automation terminal device corresponding to the fault section, and transmitting a control command including the switch operation list to the DCP server through the communication unit.

7. The system as set forth in claim 2, wherein the database comprises:

a measurement data database storing the field measurement data received from the DCP server; and an application database storing topology, load inference, condition inference, power flow calculation, voltage and reactive power that are created using the field measurement data.

8. The system as set forth in claim 7, wherein the application database comprises a data mapping table for data synchronization with the measurement data database, stores the field measurement data from the measurement data database based on the data mapping table, stores the topology, the load inference, the condition inference, the power flow calculation, the voltage and the reactive power in the measurement data database based on the data mapping table, and synchronizes data with the measurement data database.

9. The system as set forth in claim 1, wherein the SOTS terminal comprises:
a plurality of SOTS slave terminals collecting field measurement data from the distribution automation terminal devices; and
a SOTS master terminal collecting the field measurement data from the SOTS slave terminals and transmitting the field measurement data to the DCP server,
wherein the SOTS slave terminals and the SOTS master terminal comprise communication terminals conducting IEC 61850 communication.

10. The system as set forth in claim 1, further comprising an SOTS backup terminal configured to be synchronized with the SOTS terminal, the SOTS backup terminal collecting, through changeover when the SOTS terminal malfunctions, both the field measurement data that is measured at the same time by the distribution automation terminal devices provided in the respective protective devices and the event signal generated from the distribution automation terminal devices and transmitting the field measurement data and the event signal to the DCP server.

11. The system as set forth in claim 1, further comprising a DCP backup server configured to be synchronized with the DCP server, the DCP backup server receiving the field measurement data and the event signal from the SOTS terminal through changeover when the DCP server malfunctions, receiving a control command for the distribution automation terminal devices transmitted from the main server, and transmitting the control command to the corresponding distribution automation terminal device.

12. The system as set forth in claim 1, further comprising a backup server configured to be synchronized with the main server, the backup server calculating protection coordination correction values of the protective devices for system protection based on the event signal received from the DCP server when the main server malfunctions, detecting the fault section of the power distribution system based on the event signal, conducting real time system analysis using the field measurement data, transmitting control information including at least one among the detected protection coordination correction values, the fault section and the system analysis information to the DCP server, updating power distribution system information when equipment of the power distribution system is added or changed, and synchronizing the power distribution system information with the main server.

13. The system as set forth in claim 1, further comprising a backup database configured to be synchronized with the database, the backup database storing and managing the field measurement data and the event signal when the database malfunctions.

14. A method for managing a power distribution system, the power distribution system comprising a plurality of protective devices provided on lines between a substation, a transformer and a load, and a plurality of distribution automation terminal devices installed in the respective protective devices, the method comprising:
receiving field measurement data that is measured by the distribution automation terminal devices at a same time;
receiving an event signal generated from the distribution automation terminal devices;
detecting a fault section of the power distribution system based on the received event signal;
calculating protection coordination correction values of the protective devices for all independent systems of the power distribution system based on the received event signal;
conducting real time system analysis using the field measurement data received from a DCP server; and
transmitting control information including at least one among the protection coordination correction values, fault section and system analysis information to a corresponding distribution automation terminal device.

15. The method as set forth in claim 14, wherein detecting the fault section comprises:
generating a control command for detecting the fault section of the power distribution system when the event signal includes a fault indication signal;
fuzzifying a physical size for an image current of a switch that is contained in the fault indication signal using a conditional membership function when the control command for detecting the fault section is generated, thus creating fuzzy data;
conducting fuzzy inference using min-max composition based on the fuzzy data and a fuzzy rule, thus creating fuzzy inference data;
calculating an area of a consequent membership function that corresponds to a component value set for each of sections of the power distribution system using the fuzzy inference data;
calculating a center of gravity of the area of each of the sections using a center-of-gravity method;
detecting, as the fault section, a section that has a largest center of gravity among the calculated centers of gravity of the sections; and
generating a fault restoration control command for the detected fault section.

16. The method as set forth in claim 15, wherein generating the fault restoration control command comprises:
creating, based on the detected fault section, a switch operation list of a distribution automation terminal device corresponding to the fault section; and
transmitting a control command including the switch operation list to the corresponding distribution automation terminal device.

17. The method as set forth in claim 14, wherein calculating the protection coordination correction values of the protective devices comprises:
generating a protection coordination control command when the received event signal includes a topology change signal;
conducting fault calculation for all the independent systems of the power distribution system when the protection coordination control command is generated;
changing load data using at least one among a current value, a maximum value and load pattern data at a specific point of time based on a preset reference value;
calculating a protection capacity of a corresponding system by conducting power flow calculation of the independent system, to which respective switches belong, using the changed load data;

storing the protection capacity when the protection capacity of each of the independent systems is a reference value or more;

receiving initial IP addresses of the protective devices of the corresponding independent systems, when the protection capacity of each of the independent systems is the reference value or less and is in a protection coordination section using communication, and conducting a topology test to identify a pair of protective devices to transmit and receive communication signals, thus creating a final IP address list;

receiving a current protection coordination correction value and characteristic data of the protective device of the corresponding independent system, when the protection capacity of each of the independent systems is the reference value or less and is not in a protection coordination section using communication, and conducting overcurrent protection coordination correction in response to a correction rule, thus calculating a protection coordination correction value; and transmitting the final IP address list or the protection coordination correction value to the corresponding protective device.

18. The method as set forth in claim 14, wherein conducting the real time system analysis comprises conducting real time system analysis, using the field measurement data measured at the same time, when a real time system analysis control command is generated.

19. The method as set forth in claim 14, wherein conducting the real time system analysis comprises creating electrical busbars and independent systems based on current system topology;

calculating a section load of each of sections of the independent systems based on the field measurement data;

calculating a voltage, a phase and a power inflow rate of each of the busbars;

creating a base case based on the section load, the voltage, the phase and the power inflow rate; and conducting voltage and reactive power control based on the base case.

20. The method as set forth in claim 14, further comprising synchronizing field measurement data, event signal, protection coordination correction value, fault section and system analysis information that are stored in a measurement data database and an application database, based on a data mapping table.

\* \* \* \* \*